US009563398B2

(12) United States Patent
Mishra et al.

(10) Patent No.: US 9,563,398 B2
(45) Date of Patent: Feb. 7, 2017

(54) IMPEDANCE-BASED FLOW CONTROL FOR A TWO-WIRE INTERFACE SYSTEM WITH VARIABLE FRAME LENGTH

(71) Applicant: QUALCOMM Incorporated, San Diego, CA (US)

(72) Inventors: Lalan Jee Mishra, San Diego, CA (US); Richard Wietfeldt, San Diego, CA (US); George Wiley, San Diego, CA (US); Amit Gil, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/060,503

(22) Filed: Mar. 3, 2016

(65) Prior Publication Data
US 2016/0259624 A1    Sep. 8, 2016

Related U.S. Application Data

(60) Provisional application No. 62/129,697, filed on Mar. 6, 2015.

(51) Int. Cl.
G06F 13/40   (2006.01)
G06F 5/06    (2006.01)
G06F 13/42   (2006.01)
G06F 13/38   (2006.01)

(52) U.S. Cl.
CPC ............ *G06F 5/065* (2013.01); *G06F 13/385* (2013.01); *G06F 13/4086* (2013.01); *G06F 13/42* (2013.01); *G06F 13/426* (2013.01); *G06F 13/4286* (2013.01); *G06F 2205/067* (2013.01)

(58) Field of Classification Search
CPC .. G06F 13/385; G06F 13/387; G06F 13/4086; G06F 13/40; G06F 5/065
See application file for complete search history.

(56) References Cited

U.S. PATENT DOCUMENTS

| 5,600,656 A | 2/1997 | Kelsey et al. |
| 5,944,803 A | 8/1999 | Whitehouse |
| 9,092,393 B2 | 7/2015 | Whitefield et al. |
| 2004/0130361 A1 | 7/2004 | Ruat et al. |
| 2007/0230484 A1 | 10/2007 | Hu et al. |
| 2010/0241880 A1 | 9/2010 | Wertheimer et al. |
| 2014/0108679 A1 | 4/2014 | Mishra et al. |
| 2015/0301979 A1 | 10/2015 | Mishra et al. |
| 2016/0259702 A1 | 9/2016 | Mishra et al. |

FOREIGN PATENT DOCUMENTS

| CN | 101287221 A | 10/2008 |
| CN | 103888873 A | 6/2014 |
| DE | 10340806 B3 | 5/2005 |
| WO | WO-2016040884 A1 | 3/2016 |

OTHER PUBLICATIONS

International Search Report and Written Opinion—PCT/US2016/021067—ISA/EPO—May 27, 2016.
Bader E., How to get 4 UART on a MSP430? MSP Low-Power Microcontroller Forum—MSP Low-Power Microcontrollers—TI E2E Community, Retrieved dated on Feb. 17, 2016, Retrieved from the Internet URL: http://e2e.ti.com/support/microcontrollers/msp430/f/166/p/38748/135631 , 7 Pages.

Primary Examiner — Farley Abad
(74) Attorney, Agent, or Firm — Haynes and Boone, LLP

(57) ABSTRACT

A two wire interface is disclosed that serializes messaging signals and GPIO signals into frames transmitted over a transmit pin. The two wire interface is configured to perform flow control by monitoring a voltage for the transmit pin.

35 Claims, 15 Drawing Sheets

IMPEDANCE-BASED FLOW CONTROL FOR A TWO-WIRE INTERFACE SYSTEM WITH VARIABLE FRAME LENGTH

CROSS-REFERENCE TO RELATED APPLICATIONS

This application claims the benefit of U.S. Provisional Application No. 62/129,697, filed Mar. 6, 2015.

TECHNICAL FIELD

This application relates to integrated circuit interfaces, and more particularly to a two-wire integrated circuit interface with impedance-based flow control.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions are then violated.

To alleviate the pin demands suffered by conventional GPIO systems, a "virtual" GPIO architecture has been developed such in which multiple GPIO signals are serialized onto a single transmit pin such as through a finite state machine (FSM). The FSM receives the multiple GPIO signals from a GPIO interface that in turn receives the multiple GPIO signals from a processor. The GPIO interface also interfaces with conventional GPIO pins that transmit conventional GPIO signals. The distinction between the conventional GPIO signals and the virtual GPIO signals carried on the transmit pin is transparent to the processor. This is quite advantageous in that the processor needs no software modification to communicate through the GPIO interface. With regard to transmission, the processor thus presents a set of GPIO signals to the GPIO interface. Depending upon the number of conventional GPIO pins available, the GPIO interface will transmit a first subset of the GPIO signals over corresponding conventional GPIO pins. In contrast, the GPIO interface presents a remaining subset of the GPIO signals to the FSM, which serializes them and transmits them over the dedicated transmit pin.

During GPIO signal transmission, the dedicated transmit pin couples through a suitable transmission line such as a circuit board trace to a receiving integrated circuit's dedicated receive pin. A transmitting integrated circuit thus also includes a dedicated receive pin for receiving transmitted virtual GPIO signals from a remote integrated circuit. The FSM deserializes the received virtual GPIO signals into a first set of received GPIO signals that are presented to the GPIO interface. Similarly, the GPIO interface receives a second set of received GPIO signals through the conventional GPIO pins. The first and second set of received GPIO signals may then be presented to the processor in a conventional fashion through the GPIO interface. To the processor, it is thus transparent whether a given received GPIO signal was received on the dedicated receive pin as a virtual GPIO signal or over a conventional GPIO pin. The processor thus needs no software modification with regard to transmission or reception.

With regard to this advantageous virtual GPIO capability, note that a receiving circuit may not be ready to receive a frame of virtual GPIO signals (nor to receive conventional GPIO signals). Flow control allows such a receiving integrated circuit to indicate to the transmitting integrated circuit whether or not the receiving integrated circuit is able to currently receive data. In general, however, flow control requires the use of additional pins. For example, a universal asynchronous receiver transmitter (UART) interface includes a request to send (RTS) pin as well as a clear to send (CTS) pin. These two flow control pins are in addition to a dedicated receive pin as well as a dedicated transmit pin. The two additional flow control pins (RTS and CTS) for a UART interface thus increases pin count and contributes to higher manufacturing cost.

Accordingly, there is a need in the art for a GPIO architecture that can transmit and receive a plurality of GPIO signals using just a two-pin interface in which the flow control is multiplexed over the two-pin interface. More generally, there is a need in the art for multiplexed flow control for two-pin interfaces.

SUMMARY

A virtual GPIO architecture is provided for communication between two integrated circuits each having a processor. Each integrated circuit also includes a GPIO interface for communicating with the remote processor using a set of signals. This set of signals comprises a set of GPIO signals as well as a set of virtual GPIO signals. Each integrated circuit thus includes a set of GPIO pins corresponding to the set of GPIO signals. These GPIO pins are used to transmit the set of GPIO signals in a conventional manner as known in the GPIO arts. In that regard, a first GPIO signal in the set of GPIO signals is transmitted over a first GPIO pin, a second GPIO signal in the set of GPIO signals is transmitted over a second GPIO pin, and so on such that a last GPIO signal in the set of GPIO signals is transmitted over a last GPIO pin.

In contrast to the set of GPIO signals, the set of virtual GPIO (VGI) signals are transmitted over a UART transmit pin using a flow-control interface that in turn is driven by a virtual GPIO finite state machine (VGI FSM). The VGI signals for each integrated circuit comprise a transmit set and a receive set. The transmit set is transmitted over the dedicated transmit pin to the remote integrated circuit whereas the receive set is received over the dedicated receive pin from the remote integrated circuit. Note that "device" and "integrated circuit" are deemed herein to be equivalent terms. The VGI FSM in each device is configured to serially transmit the transmit set to the remote processor through a UART interface over the dedicated transmit pin. The UART interface is further configured to serially receive the receive set of VGI signals from the remote processor over the dedicated receive pin and to present the receive set of VGI signals to the VGI FSM.

The following discussion will assume that the flow control is implemented through a UART interface. But it will be appreciated that the flow control techniques discussed herein may be practiced without any UART capability. A UART interface is well-known. In its conventional format, it requires a transmit pin (TX), a receive pin (RX), a Request to Send (RTS) pin, and a Clear to Send (CTS) pin. The UART interface uses an oversampling clock signal that is typically 16 times the bit rate. So each received bit is sampled by sixteen samples. The UART transmission is straightforward: to send a binary one, the UART interface drives its TX pin to a power supply voltage VDD for the duration of the bit period as determined by sixteen cycles of its oversampling clock signal. The receiving UART interface samples the resulting received signal on its RX pin using its own oversampling clock. Transmission of a logical zero is just the complement: the transmitting UART interface grounds its TX pin for the duration of the bit period as determined by its oversampling clock signal cycling sixteen times. In some embodiments, both edges of the oversampling clock may be used such that a bit period would correspond to eight cycles of the oversampling clock.

A conventional UART interface uses another pair of pins as a control protocol. In particular, a conventional UART interface indicates that it is ready to receive data by charging a Request to Send (RTS) pin to the power supply voltage. This asserted voltage is then received at the receiving UART interface on its Clear to Send (CTS) pin. So a conventional UART interface only transmits when it sees its CTS pin voltage asserted. The resulting transmission is in frames of eight bits.

This conventional UART control protocol is modified through the VGI FSM as explained further herein to enable variable-sized frames of virtual GPIO data to be transmitted over the UART interface's TX pin. The UART interface as disclosed herein is configured to weakly pull its TX pin to VDD during idle periods (no data transmission). A beginning of a frame transmission may then demarcated by the transmitting UART interface pulling its TX pin low for a bit period. Each integrated circuit's processor provides a first set of signals to the GPIO interface. From the GPIO interface, a portion of the first set of signals are transmitted to the remote processor as a first set of GPIO signals over a first set of corresponding GPIO pins. A remaining portion of the first set of signals from the processor is provided by the GPIO interface in parallel to the VGI FSM. The VGI FSM may then serially transmit the remaining portion as a transmit set of VGI signals through the UART interface and over the dedicated transmit pin. The GPIO interface also receives a second set of GPIO signals from the remote processor over a second set of corresponding GPIO pins. Depending upon the mode of operation, the VGI FSM serially receives the receive set of VGI signals or a receive set of messaging signals from the remote processor and provides the receive set in parallel to the GPIO interface.

The UART interface may also transmit (as implied by its name) UART signals in addition to the VGI signals. The UART signals are representative of what is denoted herein as "messaging" signals to distinguish them from VGI signals. As used herein, messaging signals are signals that to the processor are associated with a corresponding address. In that regard, a conventional GPIO signal is received or transmitted on a corresponding GPIO pin. So a GPIO signal needs no address, the receiving processor knows the identity of the received GPIO signal through the identity of the corresponding GPIO pin. To identify VGI signals, the VGI FSM thus assigns each VGI signal to a corresponding bit position in a frame. For example a frame may comprises eight VGI signals arranged from a first VGI signal to an eighth VGI signal. The receiving VGI FSM thus identifies a given received VGI signal from its bit position in the frame. But messaging signals are not assigned to individual pins like conventional GPIO signals. The processor thus identifies a messaging signal by writing it to a particular register address or receiving it from a particular register address. The following discussion will assume that the messaging signals are UART signals but it will be appreciated that other types of messaging signals such as I2C signals may be used. Within a frame, the messaging signals are identified by their bit position just like VGI signals. But the VGI FSM then writes the received messaging signals to their appropriate registers rather than presenting them to the GPIO interface. The processor may then retrieve or write to the messaging registers in a conventional fashion.

With regard to the virtual GPIO signals and the messaging signals, there are two main embodiments for the disclosed virtual GPIO architecture. In a first embodiment, each frame transmitted over the dedicated transmit pin includes a header that identifies whether the frame comprises a transmit set of VGI signals or a transmit set of messaging signals. The header may also indicate frame length to be set on the receiver side or indicate an acknowledgement of the desired frame length. In a second embodiment, the header is extended for a frame that includes both VGI signals and messaging signals such that the extended header identifies the bit positions of the VGI signals and the messaging signals.

To implement flow-control, each UART interface includes an RTS control circuit that couples to the receive pin. The RTS control circuit couples the receive pin to ground through two selectable input impedances: a high input impedance and a low input impedance, wherein the high input impedance is greater than the low input impedance. The RTS control circuit applies the flow control during a stop bit that terminates each transmitted frame. If the receiving integrated circuit is not ready for any additional frames, its RTS control circuit selects for its low input impedance. Since the transmitting integrated circuit is driving its transmit pin at this time through a relatively large output impedance, the voltage on the transmitting integrated circuit's transmit pin will then drop towards ground. The transmitting integrated circuit's UART interface includes a CTS control circuit coupled to its transmit pin to detect this drop in voltage. If the CTS control circuit detects a voltage drop during the transmission of the stop bit, the transmitting integrated circuit will refrain from transmitting further frames until the voltage on its transmit pin recovers. This voltage recovery will only occur when the receiving integrated circuit's RTS control circuit selects for its high input impedance. In this fashion, flow control is achieved over the transmit pin without requiring any separate pins for the RTS and CTS functions.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A serial interface is provided that implements a variable frame-length capability as well as an impedance-based flow control over just two pins: a transmit pin and a receive pin. The following discussion will be directed to an embodiment that uses a UART interface configured for the impedance-based flow control. However, it will be appreciated that any two-pin serial interface may be modified to advantageously include the variable frame length and impedance-based flow control capabilities discussed herein. Thus, the following discussion will be directed to a VGI/UART embodiment without loss of generality.

Figure 1:
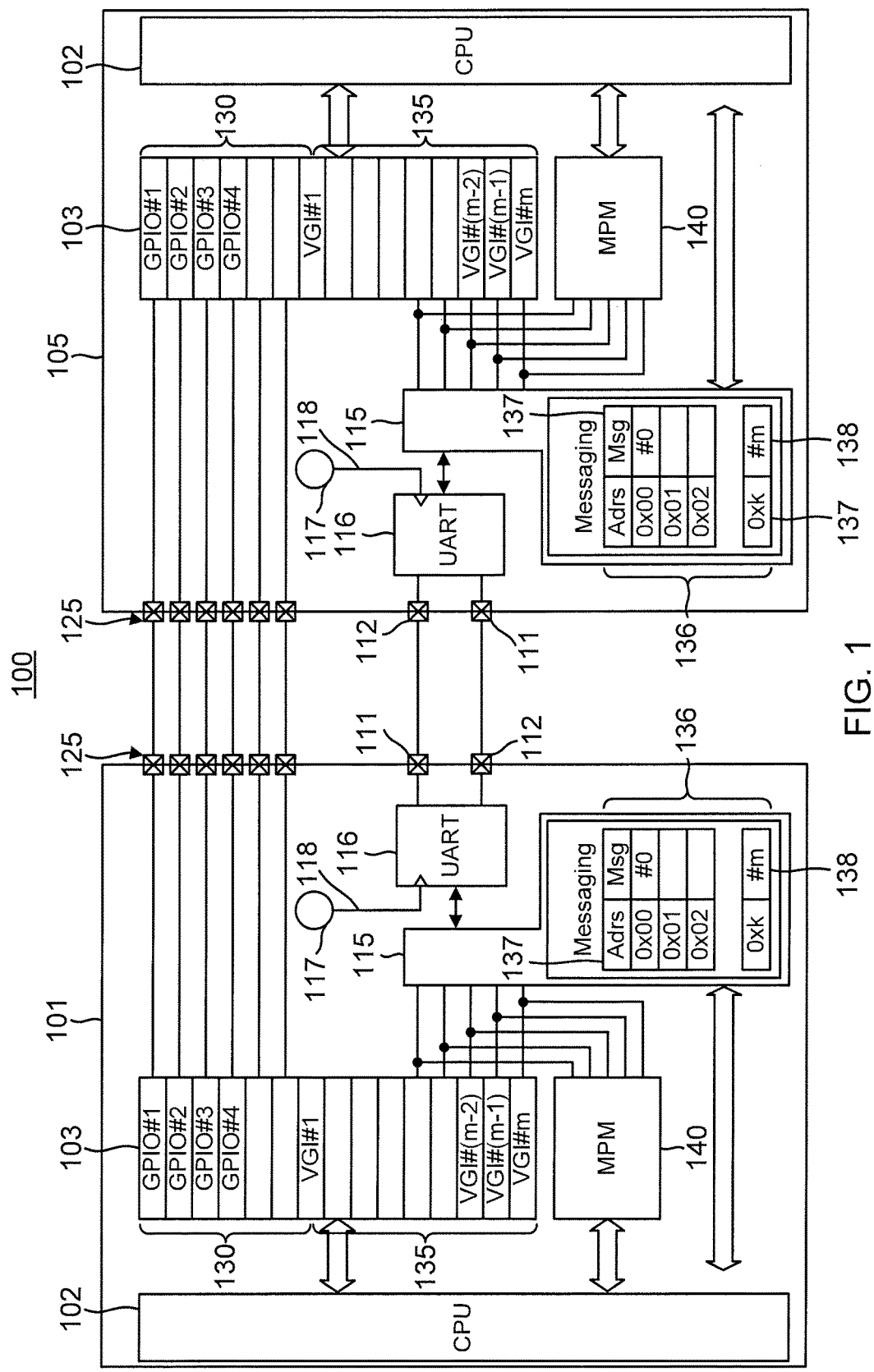
FIG. 1 is block diagram of an example VGI architecture in accordance with an aspect of the disclosure.

An example virtual general purpose input/output (VGI) architecture 100 is shown in FIG. 1. A host integrated circuit 101 and a peripheral integrated circuit 105 both include a 2-pin interface comprising a transmit (TX) pin 111 and a receive (RX) pin 112. Each TX pin 111 couples to a corresponding RX pin 112 through a suitable transmission line such as a circuit board trace that couples between host integrated circuit 101 (which may also be denoted as a host device 101) and peripheral device 105 (which may also be denoted as peripheral device 105).

Host device 101 and peripheral device 105 each includes a processor (CPU) 102. Processor 102 in host device 101 couples to a corresponding GPIO interface 103 so it may interface with a set of conventional GPIO pins 125 in a conventional fashion. Similarly, processor 102 in peripheral device 105 couples to a corresponding GPIO interface 103 so it may interface with a set of conventional GPIO pins 125. In host device 101 and peripheral device 105, a certain portion of the signals from the corresponding processor 102 is processed through corresponding GPIO interface 103 as conventional GPIO signals 130 that may be transmitted and received on conventional GPIO pins 125. For illustration clarity, only a portion of conventional GPIO signals 130 are individually labeled, starting from a GPIO signal #1 to a GPIO signal #4. But a remaining portion of the signals processed through GPIO interface 103 from the corresponding processor 102 are not transmitted or received through conventional GPIO pins 125. Instead, this remaining portion comprises a plurality of VGPIO (VGI) signals 135 that are transmitted and received through a corresponding VGI finite state machine (FSM) 115 using dedicated transmit pin 111 and dedicated receive pin 112. Each VGI FSM 115 also interfaces directly with the corresponding processor with regard to receiving and transmitting messaging signals such as UART signals 136. Since UART signals 136 are not GPIO signals, they do not couple through GPIO interfaces 103. Each FSM 115 transmits and receives UART signals 136 through its dedicated transmit pin 112 and receive pin 111. These pins are thus "hybrid" pins in that they are used for both VGI signals 135 and UART signals 136. In VGI architecture 100, the transmit and receive set of VGI signals 135 for host device 101 and peripheral device 105 comprises a plurality of m VGI signals 135, ranging from a VGI signal #1 to a VGI signal #m, where m is a positive integer.

VGI signals 135 do not each have their own dedicated pins as is the case for conventional GPIO signals 130. This is quite advantageous in that VGI architecture 100 achieves a significant reduction of pins as compared to a conventional GPIO embodiment in which each virtual GPIO signal 135 would each require its own pin. UART signals 136 would conventionally require another dedicated transmit pin and another dedicated receive pin as well. But these additional pins are also eliminated in the advantageous VGI architecture of the present matter since the messaging signals are also transmitted over transmit pin 111 and received over receive pin 112.

Figure 2A:
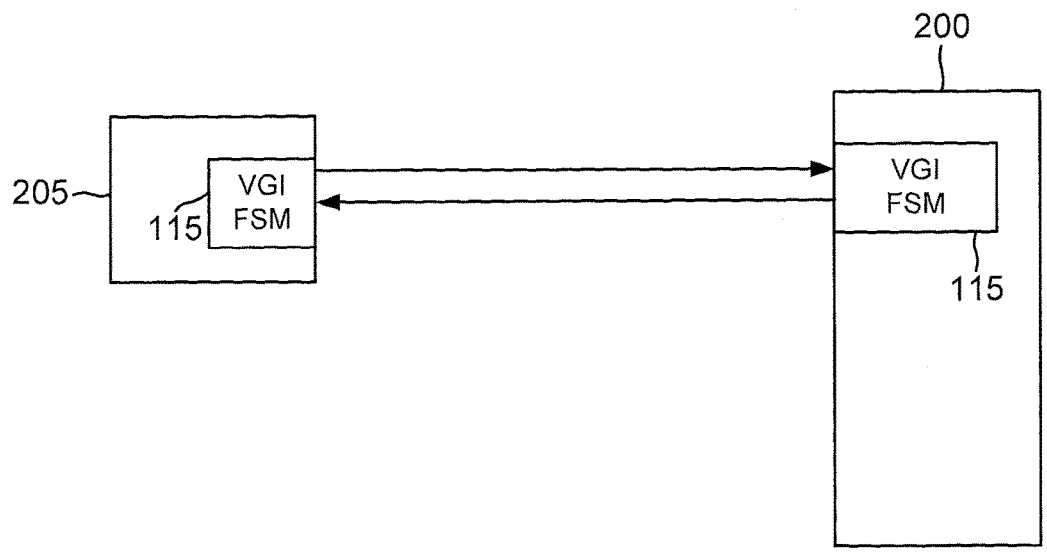
FIG. 2A is a high-level block diagram for a VGI architecture in which a processor communicates with a single remote processor.
Figure 2B:
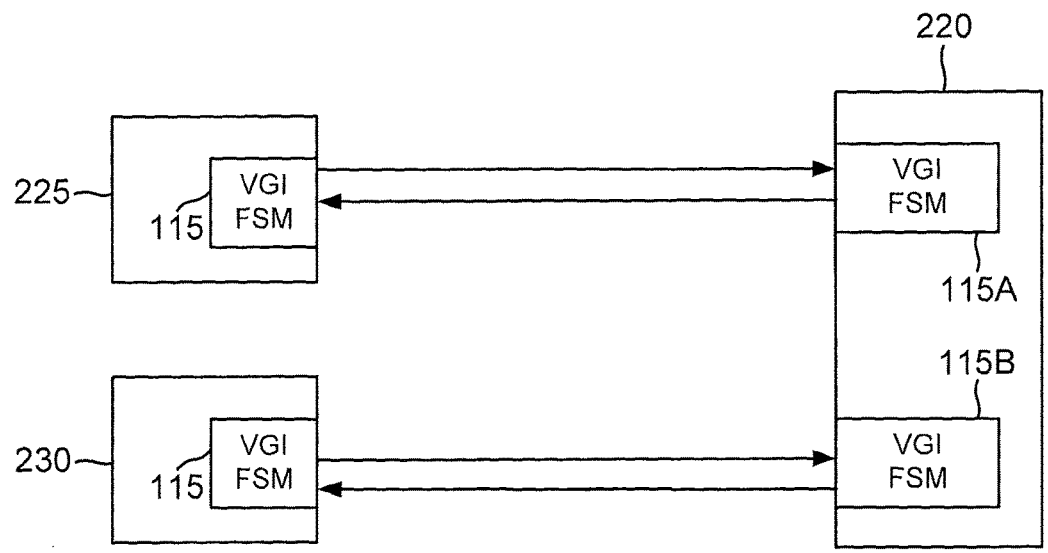
FIG. 2B is a high-level diagram for a virtual GPIO architecture in which a processor communicates with two remote processors.

An integrated circuit may include just one VGI FSM 115 or may include a plurality of these elements for interfacing with multiple external systems. FIG. 2A illustrates a VGI architecture in which an integrated circuit 200 includes a single FSM 115 for communicating with a remote processor (not illustrated) in an integrated circuit 205, which includes its own FSM 115. In contrast, an integrated circuit 220 shown in FIG. 2B includes a first VGI FSM 115A and a second VGI FSM 115B for communicating with remote processors (not illustrated) in integrated circuits 225 and 230, respectively. Each integrated circuit 225 and 230 thus includes its own VGI FSM 115. In that regard, a system on a chip (SOC) may be configured with as many VGI FSMs 115 as is necessary to accommodate VGI signaling with a plurality of other devices. Regardless of the number of VGI FSMs 115 a device may have, each VGI FSM 115 communicates using its own dedicated transmit pin 111 and a receive pin 112 as discussed with regard to FIG. 1.

Referring again to FIG. 1, because VGI signals 135 are accommodated using a finite state machine such as VGI FSM 115, processors 102 may be asleep or in another type of dormant state yet be able to receive VGI signals 135 and messaging signals 136. In this fashion, VGI architecture 100 not only advantageously economizes the number of pins for each GPIO interface 103 but is also low power.

As used herein, "pin" is a generic term to cover the structure such as a pad or an actual pin that an integrated circuit uses to couple to leads on circuit board or other suitable physical interconnects (e.g., package interconnect or through-hole via interconnect). For example, if an integrated circuit has sixteen GPIO pins or pads 125 such as shown in FIG. 1, then these pins could be configured to accommodate eight symmetric GPIO signals 130 or sixteen asymmetric GPIO signals 130. A symmetric GPIO signal 130 is transmitted by both host device 101 and peripheral device 105. An asymmetric GPIO signal 130 is one that is transmitted by only one of host device 101 and peripheral device 105. In addition, each integrated circuit can accommodate the input/output interfacing of a plurality of m VGI signals 135. Similarly, each integrated circuit can accommodate the input/output interfacing of a plurality of m UART signals 136. With regard to each processor 102, there is no difference between GPIO signals 130 and VGI signals 135: both are treated as ordinary GPIO signals that are transmitted and received as necessary through GPIO interface 103. However, since VGI signals 135 and messaging signals 136 do not have dedicated pins in contrast to conventional GPIO signals 130, VGI signals 135 and messaging signals 136 are serialized in VGI FSMs 115 for transmission on the corresponding TX pin 111. Upon reception over receive pin 112, each VGI FSM 115 deserializes the received serialized VGI signals 135 and the received serialized messaging signals 136 (as noted above, the following discussion will consider "messaging signals" and "UART signals" to be synonymous with the proviso that other types of messaging signals 136 may be used in alternative embodiments such as I2C or I3C signals. Each VGI FSM 115 thus functions as a serializer/deserializer with regard to VGI signals 135 and UART signals 136.

Processor 102 may need to receive an interrupt signal in response to changes in selected ones of VGI signals 135 or messaging signals 136. With respect to VGI signals 135, a modem power manager (MPM) 140 monitors the selected ones of VGI signals 135 such as programmed through interrupt configuration registers (not illustrated). Each VGI signal 135 has a corresponding interrupt configuration register. Should a VGI signal 135 be required to generate an interrupt in response to that signal changing state, the corresponding configuration register would be programmed accordingly. Similarly, should a VGI signal 135 be one that does not generate an interrupt regardless of whether that signal has changed state, the corresponding interrupt configuration register would also be programmed accordingly. MPM 140 may also comprise a finite state machine. Thus, just like VGI FSM 115, MPM 140 is low power and is active regardless of whether its processor is in a sleep mode or some other dormant state.

VGI signals 135 may be subdivided into a transmit set and a receive set. In a symmetric system, each transmit set would have the same number. Similarly, each receive set would have the same number of signals. However, it will be appreciated that VGI architecture 100 is advantageous in that it can readily accommodate an asymmetric signaling embodiment in which the transmit sets of virtual GPIO signals 135 and UART signals 136 have different sizes in host device 101 as compared to peripheral device 105. Similarly, the receive sets for VGI signals 135 and UART signals 136 may also have different sizes in host device 101 as compared to peripheral device 105. Regardless of whether VGI architecture 100 is symmetric or asymmetric, each VGI FSM 115 receives the transmit set of VGI signals 135 in parallel from GPIO interface 103 in the sense that each signal in these transmit sets is carried on its own lead between GPIO interface 103 and VGI FSM 115. UART signals 136 do not couple through GPIO interface 103. In that regard, each VGI FSM 115 may be given some peripheral address by the corresponding processor 102. Each VGI FSM 115 is configured to decode an address field 137 in UART signals 136 as received from the corresponding processor 102 so that a given UART signal 136 may be stored in a corresponding messaging register 138. These messaging registers 138 may each be mapped to some offset of the general address for VGI FSM 115 within the address space for the corresponding processor 102. Processor 102 can then access messaging registers 138 to obtain the appropriate UART signals 136. Just like VGI signals 135, UART signals 136 may be subdivided into a transmission set and a receive set. Regardless of whether the architecture is symmetric or asymmetric, the resulting transmission of these transmit sets for UART signals 136 by VGI FSM 115 takes place over a dedicated transmit pin 111. The transmit set of VGI signals 135 from a transmitting processor 102 becomes the receive set of VGI signals 135 for a receiving processor 102. Similarly, the transmit set of UART signals 136 from a transmitting device becomes the receive set of UART signals 136 for the receiving device. The receiving device's VGI FSM 115 then deserializes the receive set of VGI signals 135 so that they may be presented in parallel to GPIO interface 103.

After serializing the transmit set for VGI signals 135, VGI FSM 115 presents the resulting serialized transmit set to a corresponding UART interface 116. Each UART interface 116 is configured to transmit serial frames over the corresponding transmit pin responsive to cycles of an oversampling clock signal 118 from an oversampling clock source 117. As noted above, it is conventional to use a 16× oversampling frequency for oversampling clock signal 118 such that UART interface 116 transmits a binary one bit by charging its transmit pin 111 high (e.g., to a power supply voltage) for sixteen samples of oversampling clock signal 118. Similarly, each UART interface 116 transmits a binary zero bit by discharging its transmit pin 111 low (e.g., to ground) for sixteen cycles of oversampling clock signal 118. Each UART interface 116 is also configured to sample a received bit on its receive pin 112 over sixteen cycles of oversampling clock signal 118. Each UART interface 116 is also configured to compare the resulting samples to some threshold (e.g., one-half the power supply voltage used for the binary one bit transmissions) to determine the binary value of the sample. If the majority of the samples are a binary one, each UART interface 116 receives the bit as a binary one. The converse situation of receiving a binary zero bit would correspond to a majority of the samples being zero. Such UART transmission and reception is well known. But what is not conventional is the implementation of flow control over its transmit pin 111 by each UART interface 116 as discussed further herein. Similarly, it is not conventional to use a UART interface 116 to transmit and receive VGI signals 135.

Since VGI signals 135 are transmitted through the corresponding UART interface 116, the transmitted frames of VGI signals 135 may be deemed to be tunneled virtual GPIO signals 135. As discussed earlier, both UART signals 136 and VGI signals 135 need to be assigned to a corresponding bit position in the transmitted frames so that the receiving VGI FSM 115 can identify them. A transmitting device and a receiving device must thus both use a common frame size so that the bit position in a received frame is intelligible. For example, if a receiving device is configured to receive an eight-bit frame but receives a ten-bit frame, it would not know the identity of the extra two bits in the ten-bit frame. At power-up, the frame size should have a predefined size for both host device 101 and peripheral device 105. But it may be the case that one of the devices desires to use a longer or shorter frame length than the default size used at power-up. In one embodiment, the frame size may thus be programmed by a transmitting device to change the frame size expected by a receiving device. For example, the transmitting device may transmit a programming frame that includes a header that identifies the intention of the transmitting device to program or alter the current frame size used by the receiving device.

Figure 3:
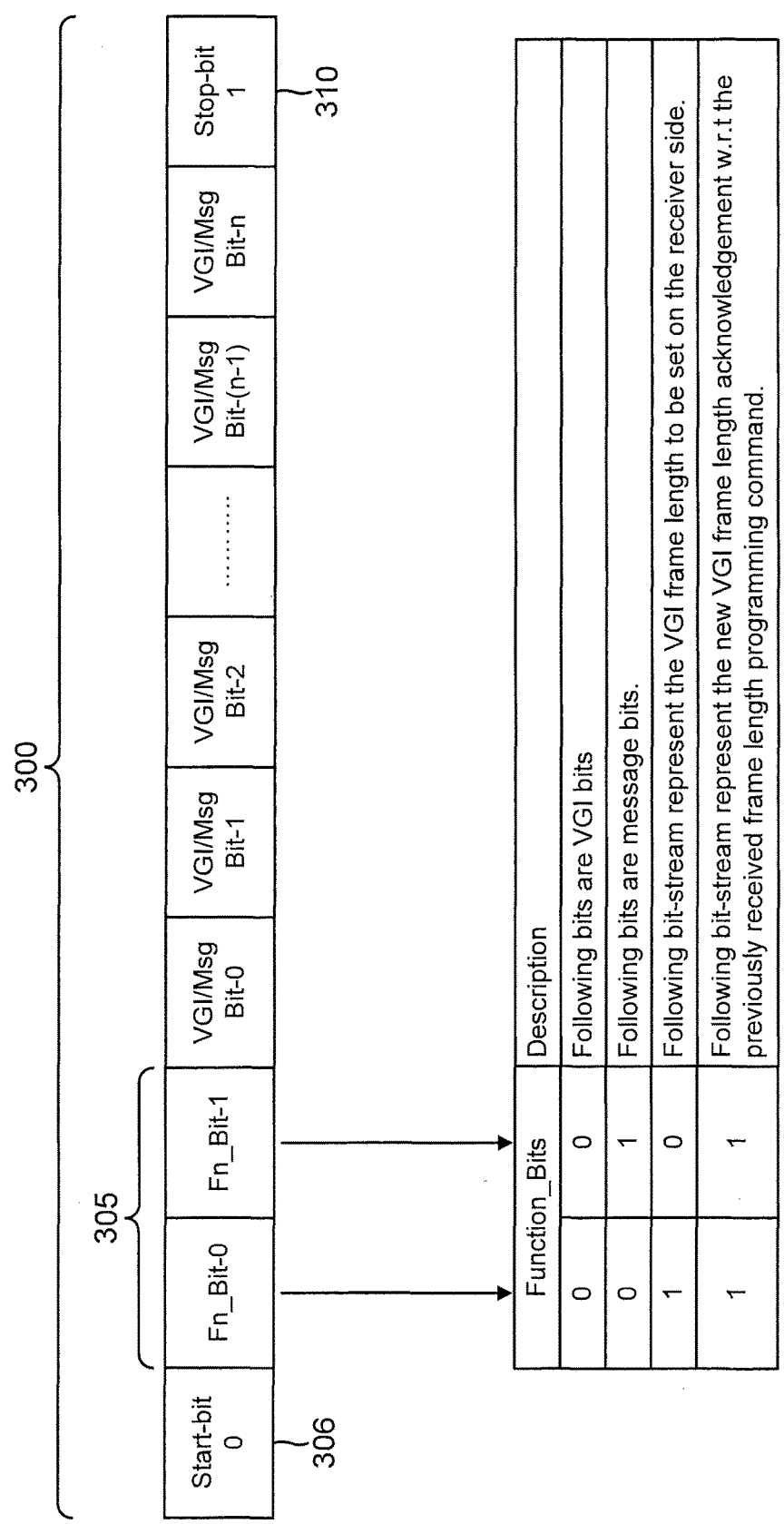
FIG. 3 illustrates an example frame format in accordance with an aspect of the disclosure.

An example frame 300 as configured by a transmitting VGI FSM 115 and corresponding UART interface 116 (FIG. 1) is shown in FIG. 3. Frame 300 begins with a start bit 306 that is discussed further below. A header 305 that follows start bit 306 may comprise two function bits, fn_0 and fn_1. However, it will be appreciated that alternative embodiments may use a greater number of function bits. In one embodiment, if both function bits are zero, the following bits in frame 300 are VGI signals 135. If fn_0 is zero and fn_1 equals 1, then the following bits are messaging signals such as UART signals 136. If fn_0 is one and fn_1 equals 0, then the following bits represent the frame length to be expected by the receiving VGI FSM 115. Similarly, if both function bits are one, the following bits represent an acknowledgement by the receiving VGI FSM 115 of the new frame length. If the transmit set of virtual GPIO signals (or the transmit set of messaging signals) is less than this fixed frame size, the unused bits within each frame may be don't care values. Alternatively, each FSM 115 may be configured to alter the size of the transmitted frames depending upon the number of bits needed for a given application.

To detect the receipt of a complete frame 300, a receiving UART interface 116 may include a logic circuit (not illustrated) that counts the number of cycles for oversampling clock signal 118 after a receipt of start bit 306. Each bit period corresponds to 16 cycles of oversampling clock signal 118 in one embodiment. For example, suppose a receive frame has a body of ten VGI signals 135 that are received responsive to 160 cycles of oversampling clock signal 118. The sampling of header 305 requires 32 samples since it is two bits. After detection of start bit 306 and waiting another 160+32 cycles of oversampling clock, a receiving UART interface 116 would then expect receipt of a stop bit 310. Should stop bit 310 be detected accordingly, UART interface 116 may then strobe the corresponding VGI FSM 115 with the frame 300. After latching frame 300 within VGI FSM 115, the corresponding receive set of VGI signals 135 may then be presented to GPIO interface 103. Alternatively, if frame 300 has a body of UART signals 136, VGI FSM 115 writes them to the appropriate messaging registers 138.

A transmit set of VGI signals 135 may thus be transmitted in frame 300. Since the transmit set for a transmitting device becomes the receive set for a receiving device, the receive set is also framed accordingly. This framing is advantageous in that each processor can then monitor the health of the remote processor without needing any additional dedicated pins. For example, each UART interface 116 may be configured to weakly pull its transmit pin 112 (and hence weakly pull the corresponding receive pin 112 for the receiving UART interface 116) to a power supply voltage during a default state (no transmission of frames). Start bit 306 would be a logical zero for such an embodiment such that UART interface 116 grounds its transmit pin 111 for the appropriate number of cycles of oversampling clock signal 118 (the appropriate number corresponding to the oversampling rate) to transmit start bit 306. In this fashion, each UART interface 116 may readily detect receipt of the start bit by detecting that receive pin 112 has been pulled towards ground for the appropriate number of cycles of oversampling clock signal 118. In one embodiment, start bit 306 and stop bit 310 are logical complements of each other.

There is the possibility that a receiving device has malfunctioned such that it inappropriately pulls its transmit pin 111 to ground. The receiving UART interface 116 would thus detect this as a start bit 306 and begin counting toward the end of the frame accordingly. But stop bit 310 is a logical one in this embodiment such that each UART interface 116 charges its TX pin to the power supply voltage for a bit duration to signal the end of a frame transmission. If a transmitting device malfunction (e.g., its processor crashes) such that a receiving UART interface 116 has detected what is deemed to be a start bit 306, a subsequent stop bit 310 will not be detected so that the receiving VGI FSM 115 may notify its processor 102 of the failure of the transmitting processor 102 accordingly.

Figure 4:
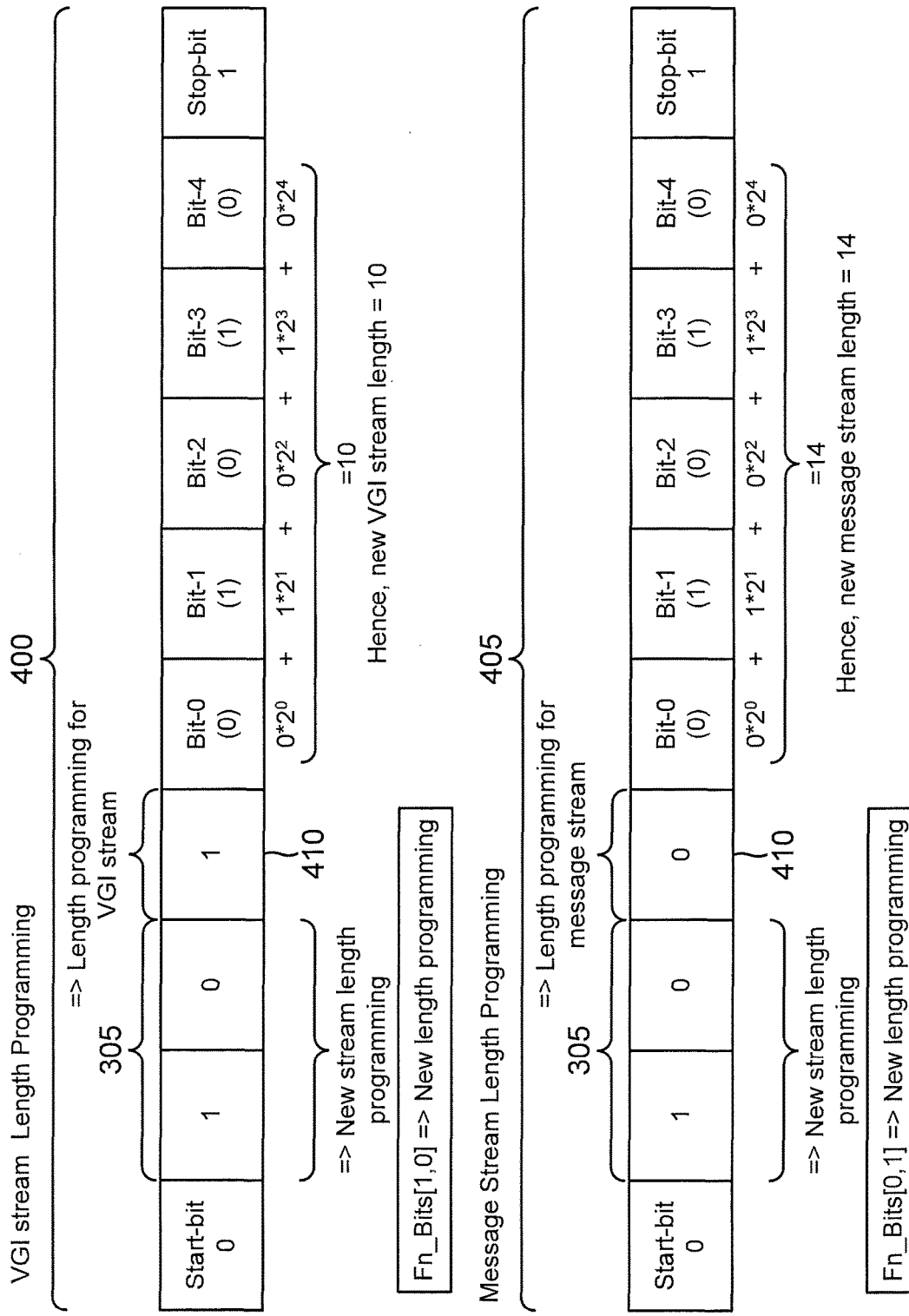
FIG. 4 illustrates length-programming frames used to program the VGI and messaging frame lengths.

Consider the advantages of frame 300: with just the overhead of two function bits 305, a start bit 306, and a stop bit 310, frames of UART signals 136 and VGI signals 135 may be transmitted over just one dedicated transmit pin 111. An example VGI programming frame 400 to set the VGI frame length as well as an example UART programming frame 405 to set the UART frame length are shown in FIG. 4. The frame length is predefined upon power-up. Thus, once a VGI FSM 115 receives a frame with a header 305 indicating that a programming length is being set (such as fn_0 equal 1 and fn_1 equal 0 as discussed previously), then it is known how many programming bits will follow. For example, if the predefined frame length (for the VGI data payload) is eight bits, there will be eight programming bits. In that regard, a receiving VGI FSM 115 needs to know whether the length of a VGI frame or a UART frame is being programmed. Thus, each header 305 in frames 400 and 405 is followed by an identity bit 410. For example, an identity bit 410 equaling one as shown in VGI programming frame 400 may signify that a VGI frame length is being programmed whereas an identity bit 410 equaling zero as shown in UART programming frame 405 may signify that a UART frame length is being programmed. Each programming bit in the programming payload following identity bit 410 represents a binary power of two. The programming bits range from bit 0 (representing 2 to the zeroth power) to a bit 4 that represents 2 to the fourth power. In VGI programming frame 400, only programming bit 1 and bit 3 are binary ones so the frame length equals the sum of 2 and 8, which equals 10. The VGI frame length expected by the receiving VGI FSM 115 would then be reconfigured from a default value such as 8 bits to 10 bits following reception of VGI programming frame 400. Similarly, programming bits 1 and 3 are the only binary ones in UART programming frame 405. Thus, the UART frame length would be changed from the default value to ten bits following receipt of UART programming frame 405. Both VGI programming frame 400 and UART programming frame 405 begin with a start bit and end with a stop bit as discussed with regard to FIG. 3.

Figure 5:
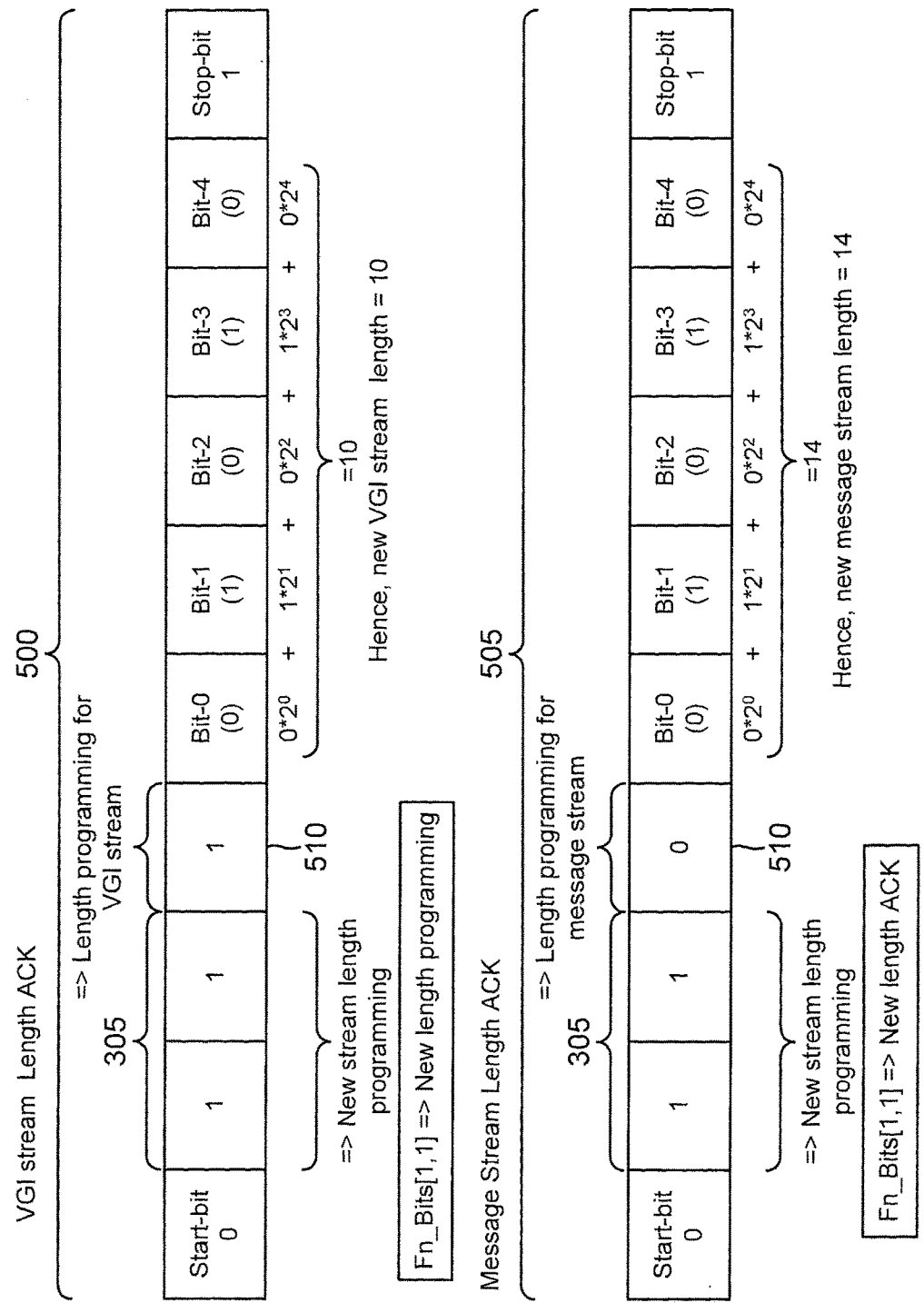
FIG. 5 illustrates acknowledgement frames transmitted to acknowledge the frame lengths programmed in response to the frames of FIG. 4.

Once the frame length has been programmed, the receiving VGI FSM 115 may confirm that it will use the new frame length by transmitting an acknowledgement frame over its transmit pin 111. An example VGI acknowledgement frame 500 and an example UART acknowledgement frame 505 are shown in FIG. 5. The function bits 305 are 1 and 1 as discussed with regard to FIG. 3 to identify that an acknowledgment frame is being transmitted. An identity bit 510 following header 305 in VGI acknowledgment frame 500 has a binary one value to identify that VGI acknowledgment frame 500 acknowledges the setting of a new VGI frame length. The bits in the payload following identity bit 305 match what was intended to be programmed by VGI programming frame 400 (FIG. 4). These bits have the same binary weighting as discussed with regard to FIG. 4. A UART acknowledgement frame 505 has its identity bit 510 set to zero to identify it as a UART acknowledgement frame. Its payload has the same binary weighting as used for VGI acknowledgment frame 500. VGI acknowledgement frame 500 and UART acknowledgement frame 505 both start with a start bit 306 and end with a stop bit 310 as discussed with regard to FIG. 3.

Figure 6:
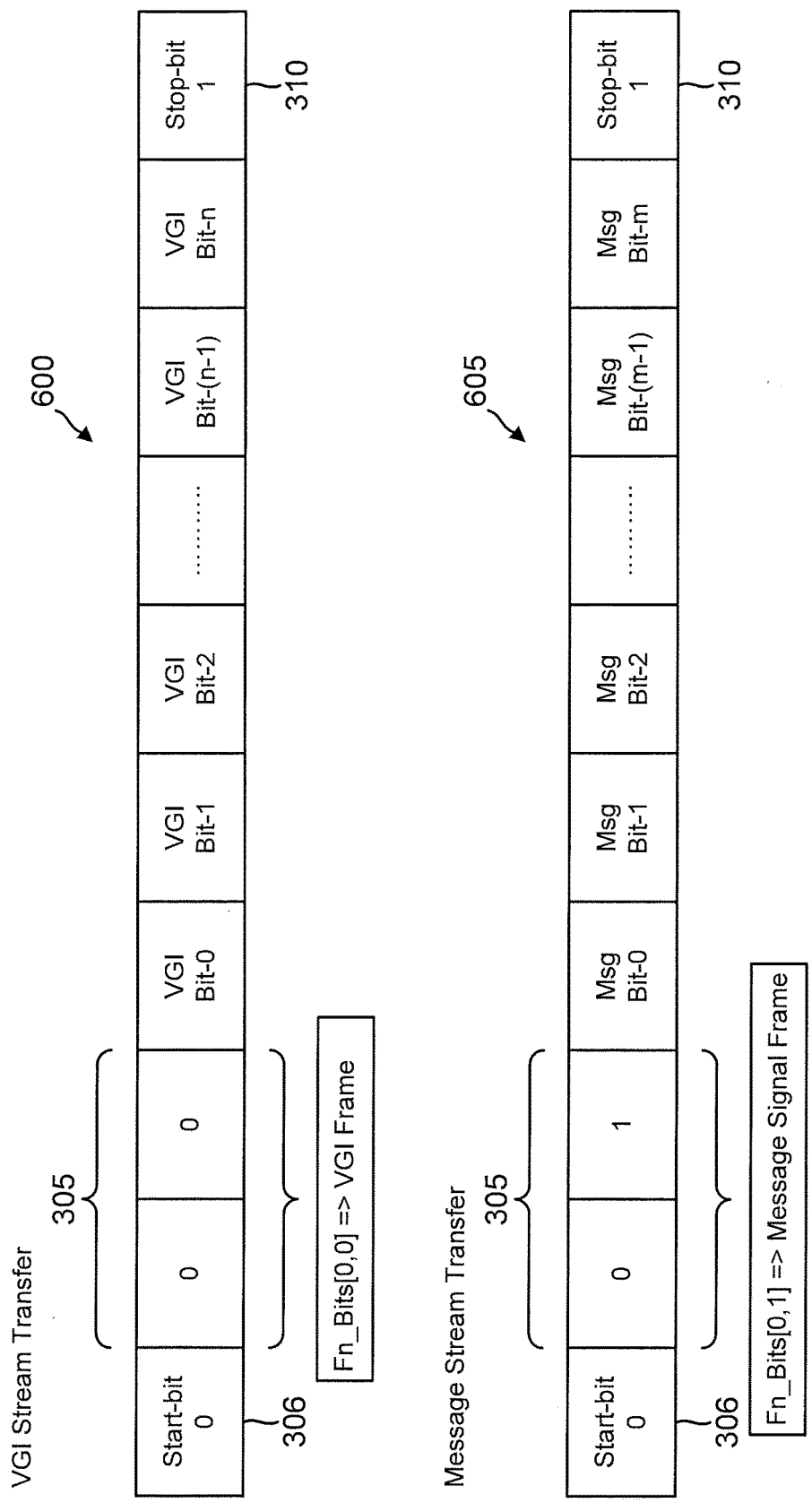
FIG. 6 illustrates an example VGI frame and an example messaging signal frame.

Once the frame lengths are thus programmed, a VGI frame 600 or a UART frame 605 may be transmitted as shown FIG. 6. VGI frame 600 was programmed for a payload length (n+1) VGI bits so the VGI bits (which follow function header 305) range from a VGI bit 0 to an nth VGI bit n (n being a positive integer). Without the corresponding serialization over transmit pin 111, these (n+1) VGI signals 135 would require (n+1) conventional GPIO pins 125.

Figure 7:
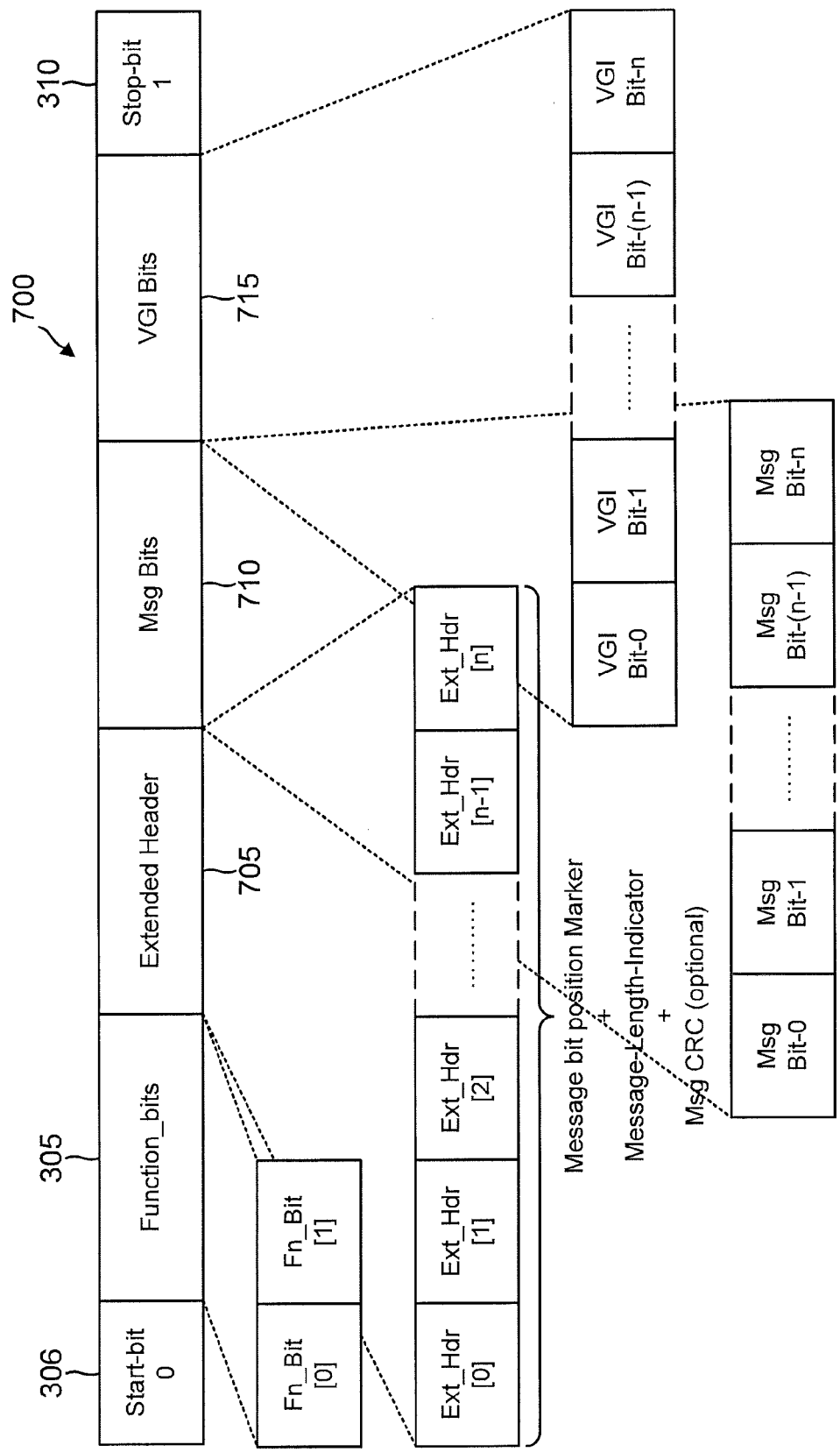
FIG. 7 illustrates a hybrid frame that includes both VGI signals and also messaging signals.

As discussed previously, there is an alternative embodiment in which a frame from a transmitting VGI FSM 115 includes both VGI signals 135 and UART signals 136. These frames may be denoted herein as "hybrid" frames since they mix UART signals 136 with VGI signals 135. For example, FIG. 7 shows an example hybrid frame 700 that includes a start bit 306 followed by function header 305 as well as an extended header 705. Extended header 705 indicates the bit position of a set of messaging signal (e.g., UART) bits 710 and a set of VGI bits 715 following extended header 705 and before stop bit 310. Depending upon the latency requirements, UART bits 710 or VGI bits 715 may be first in the frame body. In some embodiments, extended header 705 may include error correction bits such as cyclical redundancy checking (CRC) bits. Note that extended header 705 need merely identify the position and length of just the VGI bits 715 or just the UART bits 710 since the remaining bits are thus known by default to belong to the remaining bit positions. To identify the number of bits contained in VGI bits 715 or the number of bits contained in UART bits 710, the extended header bits ranging from a zeroth extended header bit EXT_Hdr[0] to an nth extended header bit EXT_Hdr[n] may each identify a corresponding power of two as discussed with regard to the programming payloads of FIG. 5.

Figure 8A:
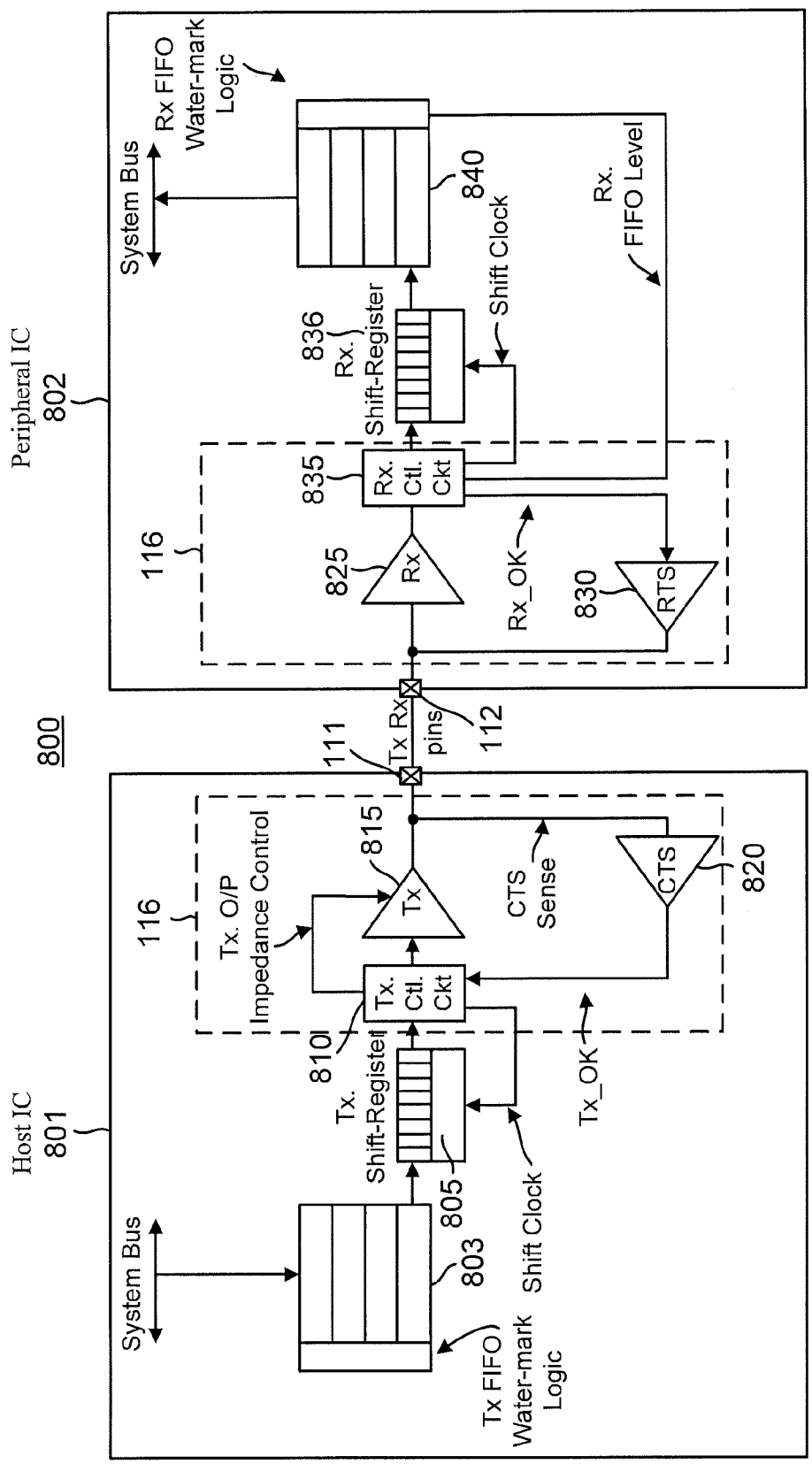
FIG. 8A illustrates the impedance-based flow control circuitry for the system of FIG. 1.

The impedance-based flow control as implemented through each UART interface 116 will now be addressed. FIG. 8A illustrates aspects of the flow control circuitry for a system 800 including a host integrated circuit (IC) 801 and a peripheral IC 802. For illustration clarity, only the transmitting circuitry is shown in UART interface 116 in host IC 801. Similarly, only the receiving circuitry is shown in UART interface 116 in peripheral IC 802. Due to the simplification, only the transmit (TX) pin 111 is shown on the host IC 801. Similarly, only the receive (RX) pin 112 is shown on the peripheral IC 802. It will be appreciated, however, that these interfaces contain both types of pins as discussed with regard to FIG. 1. VGI FSM 115 in host IC 801 is represented by a transmit shift register 805 and by a receive shift register 836 in the peripheral IC 802.

A processor or other data source (not illustrated) in host IC 801 provides source data such as GPIO signals or UART signals. In system 800, the frames (not illustrated) transmitted over transmit pin 111 may be either VGI frames 600, UART frames 605, or hybrid frames 700 as discussed earlier. VGI FSM 115 (as represented by shift register 805) in host IC 801 also includes or associates with a first-in-first-out (FIFO) memory 803 that receives the data from the system bus. It will be appreciated that the corresponding GPIO interface 103 (for the transmission of VGI frames 600) is not shown in system 800 for illustration clarity. Peripheral IC 802 includes a corresponding FIFO memory 840 coupled to its system bus. As is conventional, each FIFO memory 803 and 840 may include FIFO water-mark logic to monitor its ability to receive additional data. According to its first-in-first-out logic, host FIFO memory 803 will then load its earliest-loaded data into transmit shift register 805. A transmit control circuit 810 in UART interface 116 strobes transmit shift register 805 to shift in its contents using a shift clock that cycles once every sixteen cycles of a 16× oversampling clock signal (not illustrated). Other oversampling clock rates may be used in alternative embodiments. Transmit control circuit 810 receives the shifted-in bits from transmit shift register 805 and controls a transmit (Tx) buffer 815 to drive the voltage of the transmit pin 111 according to the binary value of the shifted-in bits. For example, Tx buffer 815 may respond to a shifted-in binary one to drive its transmit pin 111 with the power supply voltage over sixteen cycles of the 16× oversampling clock signal to transmit a binary one. Conversely, Tx buffer 815 is configured to respond to a shifted-in zero bit to ground its transmit pin 111 over sixteen cycles of the 16× oversampling clock signal to transmit a binary zero. It will be appreciated that VGI FSM 115 (FIG. 1) will insert the desired start bits, headers, extended headers, identity bits, and stop bit into the resulting shifted out frame of data from transmit shift register 805 as discussed earlier.

As will be explained further below, transmit buffer 815 is configured to select between two output impedances: a high output impedance, and a low output impedance. From the start bit through to the data payload transmission of a frame, transmit control circuit 810 commands transmit buffer 815 to use its low output impedance. In addition, transmit control circuit 810 commands transmit buffer 815 to use its low output impedance over some initial portion of the frame's stop bit such as over one or two cycles of the 16× oversampling clock signal. Transmit control circuit 810 then commands transmit buffer 815 to uses its high output impedance for the remainder of the stop bit transmission and also during any waiting period between frame transmissions. The high output impedance is substantially greater than the low output impedance.

During the high output impedance portion of the stop bit transmission, a clear-to-send (CTS) control circuit 820 in the host's UART interface 116 then detects whether the transmit pin voltage is a binary one or a binary zero using some threshold level such as one half of the power supply voltage (or more generally, a transmit voltage used by transmit buffer 815 to transmit binary one values, which may equal the power supply voltage or may be reduced to save power). Based upon the binary value of the transmit pin voltage, CTS control circuit 820 may then drive its output signal (Tx_OK) accordingly. For example, a binary zero value for the output signal Tx_OK may trigger transmit control circuit 810 to not strobe shift register 805 to shift in a subsequent frame following the stop bit transmission for the current frame. This idle state would continue until CTS control circuit 820 again detects that the transmit pin voltage is a binary high value such that it asserts it output signal Tx_OK accordingly. Transmit control circuit 810 would then command transmit buffer 815 into its low output impedance state to begin another frame transmission (assuming there is one to transmit, which depends upon the state of the host's FIFO buffer or memory 803).

In peripheral IC 802, a receive (RX) buffer 825 in its UART interface 116 is configured to receive each frame over its RX pin 112. For example, RX buffer 825 may comprise an inverter (or a comparator, not illustrated) in which the RX pin voltage drives the gates of the inverter transistors. Since MOSFET transistors present a relatively high impedance at their gates, the RX buffer 825 has a correspondingly high input impedance. RX buffer 825 is configured to sample each bit in the received frames responsive to an oversampling clock signal (not illustrated). At a 16× oversampling rate, each bit in a received frame is represented by 16 samples. Based upon the binary state of each set of 16 samples, RX buffer 825 makes a bit decision to drive a resulting received bit to a receive control circuit 835 that in turn shifts the received bit into receive shift register 836 responsive to a strobe of a shift clock. The strobing of receive shift register 836 may thus have a period equaling sixteen cycles of the 16× oversampling clock signal. Once an entire frame is loaded into shift register 836, the resulting frame may be shifted into receive FIFO buffer 840 so that it may be eventually presented in parallel over a system bus to a processor or other data sink (not illustrated) in peripheral IC 802.

The input impedance for RX buffer 825 is fixed to a high impedance value as discussed above. But a request-to-send (RTS) control circuit 830 can select between two input impedances for RX pin 112: a low input impedance and a high input impedance. The high input impedance is typically considerably higher than the high output impedance for host IC 801 (e.g., 10 KΩ). The low input impedance is considerably less than the high input impedance. During a default mode and also when receiving the start bit through to the data payload of the current frame, RTS control circuit 830 presents it high input impedance to receive pin 112. During this low input impedance presentation, RTS control circuit 830 is thus effectively isolated from affecting the receive pin voltage. Receive control circuit 835 detects the beginning of a received stop bit for a current frame and checks a receive (RX) FIFO level within receive FIFO buffer 840 to determine if receive FIFO buffer 840 has sufficient storage available to receive another frame. Like transmit FIFO buffer 803, receive FIFO buffer 840 may include water-mark logic or other suitable circuits to generate the RX FIFO level signal. If there is sufficient storage available, receive control circuit 835 does not change the default high output impedance for RTS control circuit 830 over the remaining portion of the stop bit for the current frame. But if there is not sufficient storage available, receive control circuit 835 commands RTS control circuit 830 to select for its low input impedance (e.g., 50 ohms). This low input impedance may substantially equal the low output impedance for peripheral IC 801. The resulting voltage divider caused by the low input impedance of RTS control circuit 830 in peripheral IC 802 compared to the high output impedance of transmit buffer 815 in host IC 801 causes RTS control circuit 830 to rapidly deplete the charge on its RX pin 112, which in turn discharges TX pin 111 for the host IC 801. The CTS control circuit 820 in the host IC 801 then detects this transmit pin voltage drop so that the host IC 801 goes into a waiting mode in which it refrains from sending an additional frame until its TX pin voltage is restored. RX control circuit 835 in peripheral IC 802 determines when its RX FIFO level indicates that there is sufficient storage capability to receive another frame, whereupon RX control circuit 835 commands RTS control circuit 830 to resume its default high output impedance. The resulting recovery of the TX pin voltage at host IC 801 then triggers the transmission of another frame. The flow-control between host IC 801 and peripheral IC 802 thus requires no separate CTS or RTS pins.

Figure 8B:
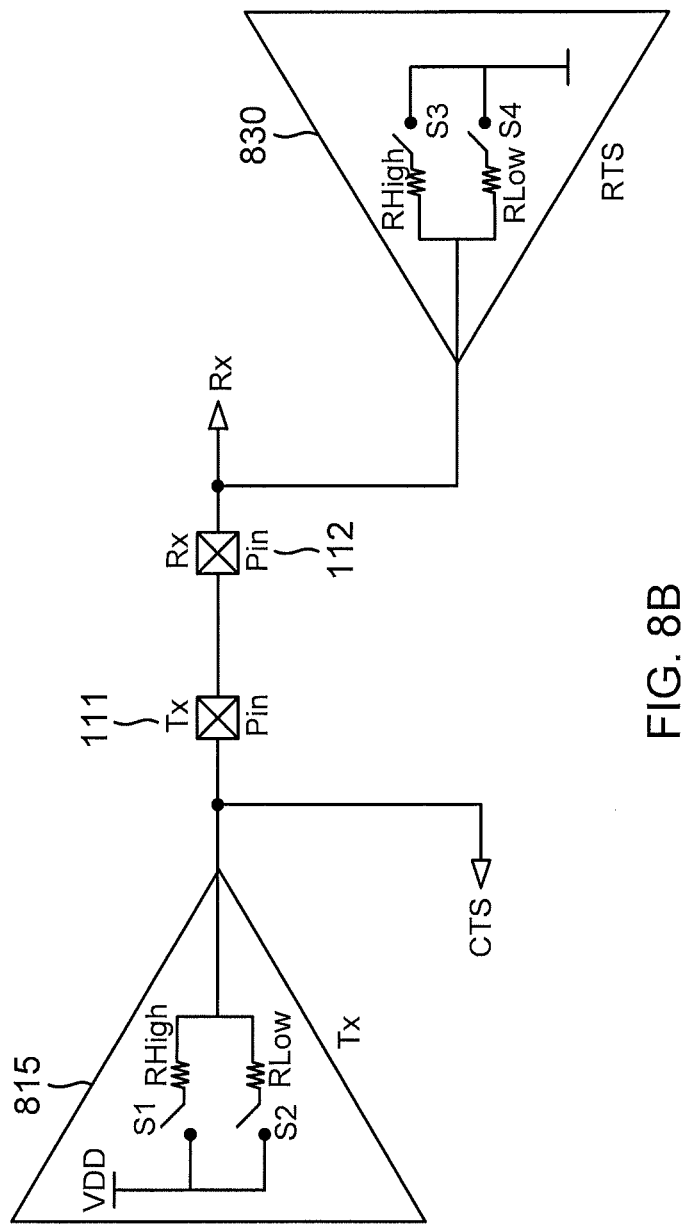
FIG. 8B illustrates further details for the TX buffer and RTS control circuit in the system of FIG. 8A.

An example embodiment for TX buffer 815 and RTS control circuit 830 is shown in FIG. 8B. A switch S1 in TX buffer 815 couples to the transmit pin 111 through a resistor RHigh. Similarly, a switch S2 couples to the transmit pin 111 through a resistor RLow. The resistance of RHigh is the high output impedance discussed above such as 10K ohms whereas the resistance of resistor RLow is the low output impedance also discussed above such as 50 ohms. During the transmission of a frame from its start bit through the end of the data payload, switch S2 in TX buffer 815 is closed whereas switch S1 is opened. This beginning portion of a frame (indeed the majority of the frame) is thus transmitted using the low output impedance. This low output impedance continues over at least the first oversampling clock cycle for the frame's stop bit. For the remainder of the stop bit transmission, switch S1 is closed and switch S2 opened so that the remainder of the stop bit is transmitted using a high output impedance. It will be appreciated that switch S1 may be omitted in alternative embodiments such that transmit pin 111 is always weakly charged to the power supply voltage VDD through the resistor RHigh. A control signal (not illustrated) may control the closing of switch S2 so that transmit pin 111 is strongly charged to the power supply voltage VDD during the beginning portion of a frame through at least the first oversampling clock cycle for the frame's stop bit. To prevent glitches, CTS control circuit 820 may be enabled by a complement of the control signal driving switch S2. In this fashion, CTS control circuit 820 will only be active when TX control circuit 815 is weakly charging transmit pin 111.

RTS control circuit 830 includes an analogous arrangement of switches S3 and S4 and an analogous pair of resistors RHigh and RLow. During the majority of the received frame reception (from the start bit through an initial sample of samples of the stop bit), switch S3 is closed and switch S4 open to, present a high input impedance (the resistance of resistor RHigh) to receive pin 112. The resulting voltage division between the peripheral IC's high input impedance and the host IC's low output impedance enables TX buffer 815 to quickly charge its TX pin voltage (or discharge depending on each bit's binary value) during this initial portion of the transmitted/received frame. When TX buffer 815 switches to its high output impedance for the remainder of the stop bit transmission, RTS control circuit 830 closes switch S4 and opens switch S3 to present a low input impedance to RX pin 112 if there is insufficient room in RX FIFO buffer 840. If there is sufficient room, switch S3 remains closed and switch S4 remains open.

Figure 9:
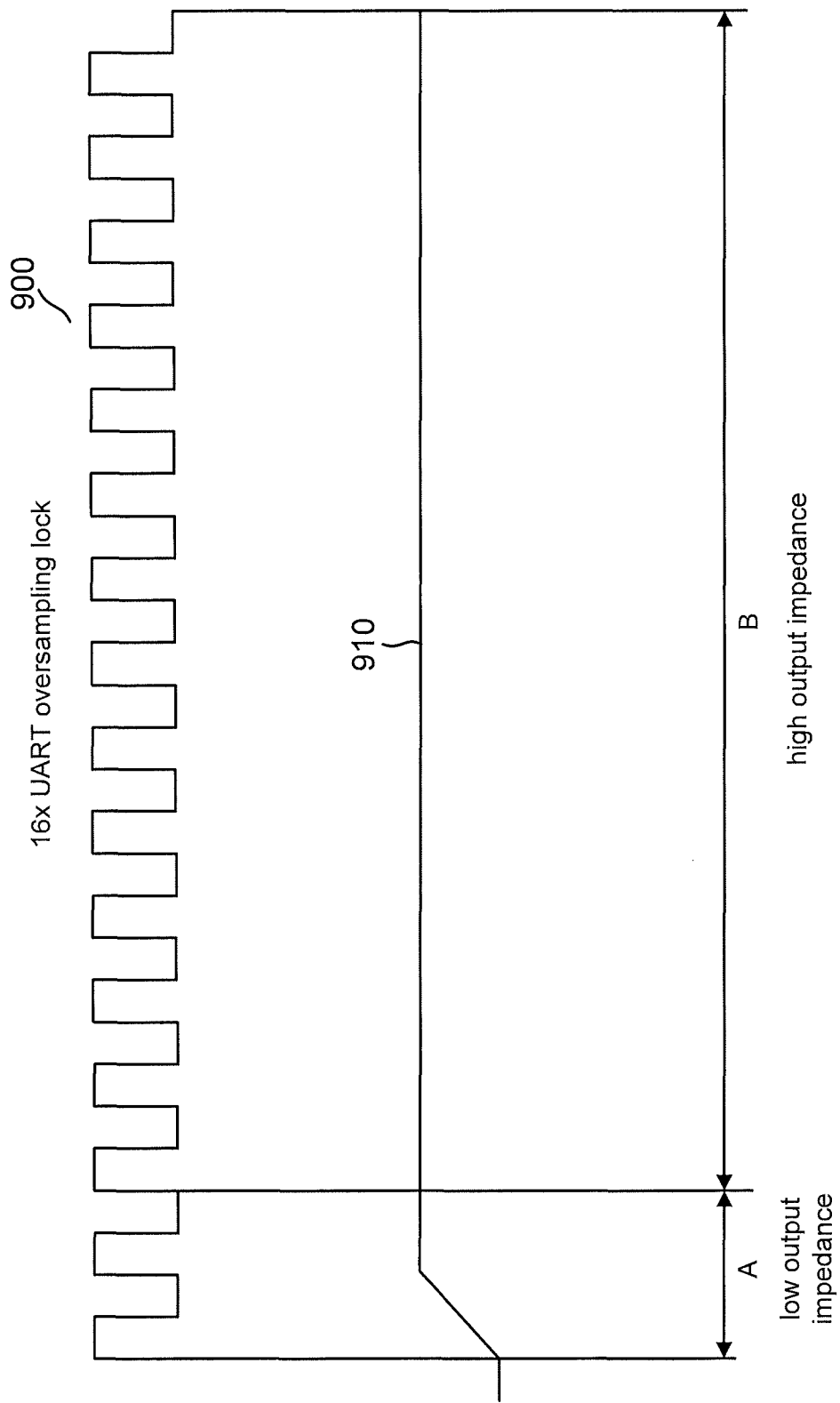
FIG. 9 illustrates the varying output impedances for a stop bit in a frame transmitted by the system of FIG. 8A.

The timing for the output impedance for TX buffer 815 during the transmission of a stop bit 910 such as discussed with regard to FIG. 3 is illustrated in FIG. 9. The duration of an initial low output impedance period A and a subsequent high output impedance period B are determined responsive to cycles of a 16× UART oversampling clock signal 900. In one embodiment, the initial low output impedance period A occurs during the first two cycles of the 16× UART oversampling clock signal 900. The high output impedance period B would then occur over the remaining fourteen cycles of the 16× UART oversampling clock signal 900 in such an embodiment. In light of the initial low output impedance period, stop bit 910 may quickly be driven to the desired logic high level.

Figure 10:
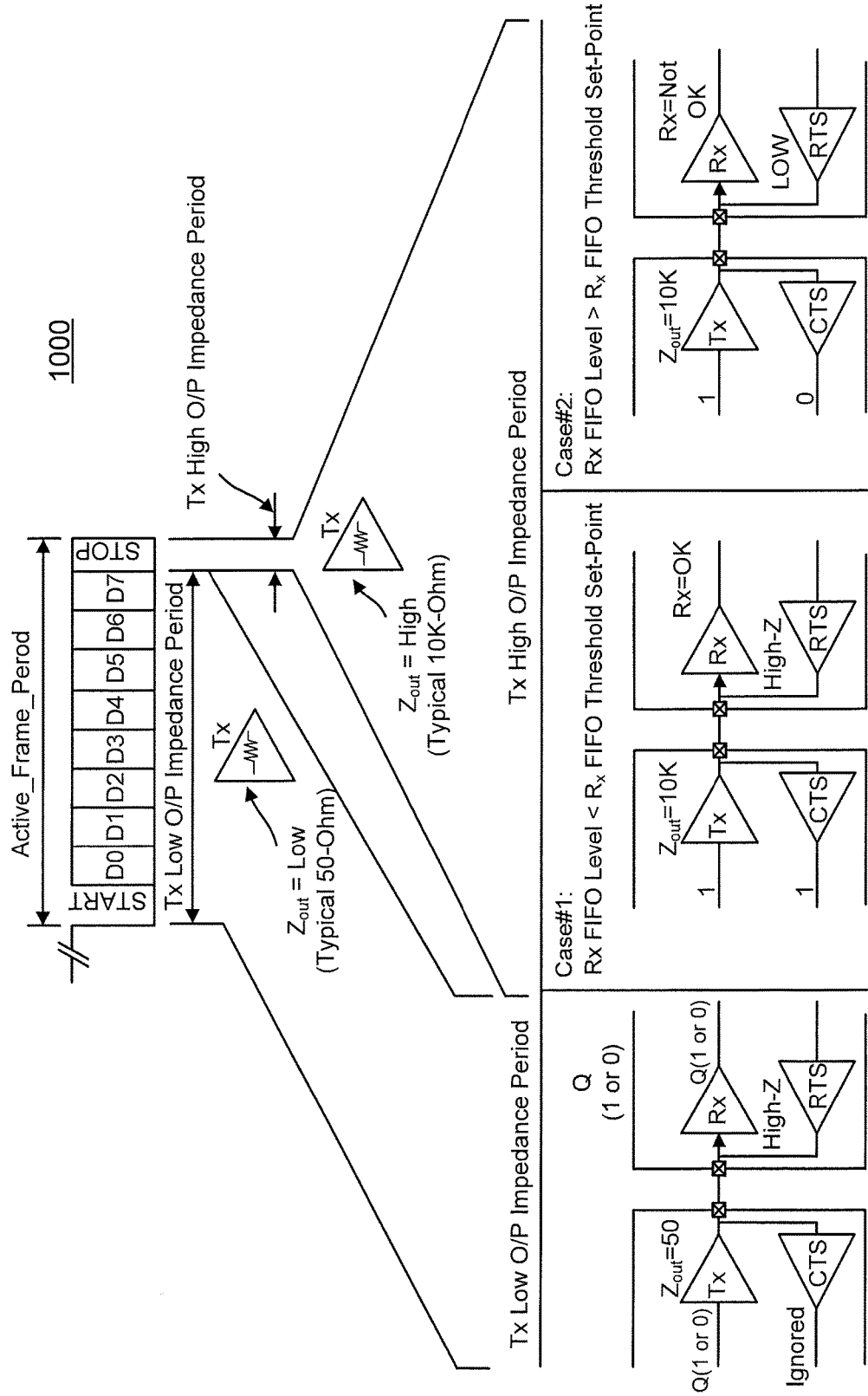
FIG. 10 illustrates the low impedance period and high impedance period for a data frame in accordance with an aspect of the disclosure.

An example frame 1000 transmitted by a transmitting device is shown in FIG. 10. In addition, the impedance state for the TX buffer (indicated by "TX") in host IC 801 and the impedance state for the RTS control circuit (indicated by "RX") in the receiving device are also shown. In this embodiment, the frame 1000 has an eight bit data payload but such a length may be varied in alternative embodiments. The transmitting device begins frame 1000 by pulling its TX pin low for the start bit duration. Like the data bits and the stop bit in frame 1000, the start bit may have a period corresponding to sixteen cycles of a 16× oversampling clock signal. In alternative embodiments, a different oversampling rate may be used to time the duration of the bits in frame 1000. Frame 1000 ends in a stop bit during which the TX buffer attempts to charge the TX pin voltage high.

The RX buffer samples the received frame using its oversampling clock signal such as a 16× oversampling clock signal. During the transmission of the start bit, the subsequent data bits, (the function bits in the header are not shown in frame 1000 for illustration clarity but these bits would also be transmitted at a low output impedance) and an initial portion of the stop bit, the TX buffer uses its low output impedance ($Z_{out}$ equaling 50 ohms). During this time, the RTS control circuit in the receiving device uses its high input impedance ("High-Z") so that the TX buffer can quickly swing the voltage of its TX pin to the appropriate binary value (VDD or ground) responsive to the binary value of each transmitted bit. In addition, the TX buffer can also quickly charge the TX pin to the power supply voltage during the initial portion of the stop bit such as over one cycle of the 16× oversampling clock. Over the remaining cycles of the oversampling clock for the stop bit as discussed previously with regard to FIG. 9, the TX buffer uses its high output (O/P) impedance. There are two receiver states illustrated in FIG. 10 for this TX buffer high output impedance period during the remainder of the stop bit transmission. In a first state (Case #1), the RX FIFO level is below a FIFO threshold set point such as determined within the receiver control circuit (not illustrated). Such a condition indicates that there is storage capability within the receive FIFO buffer (also not illustrated). The RTS control circuit in the receiving device thus maintains its default high output impedance for the duration of the stop bit. In a second state (Case #2), the RX FIFO level is greater than a FIFO threshold set point. The TX buffer initially drives a beginning portion of the stop bit using a low output impedance so that the transmit pin voltage may be readily charged to the power supply voltage during this initial stop bit period.

In response to detecting the high voltage of the RX pin for the initial portion of the stop bit, the RTS control circuit in the receiving node can do one of two things: it may couple the RX pin to ground through a low input impedance or through a high input impedance. The RTS control circuit makes such a selection as discussed above. If the receiving UART interface is ready to receive a frame (indicated in FIG. 10 as an RX=OK condition for Case #1), the RTS control circuit couples the RX pin to ground through a high input impedance, preferably a high input impedance that is considerably larger than the high output impedance used in the TX buffer. The result is that the TX buffer and the RTS control circuit form a voltage divider that maintains the RX pin voltage high if the receiving UART interface is ready to receive a frame. The transmitting modified UART interface senses this high voltage through its CTS control circuit. If the CTS control circuit senses that its TX pin voltage is high during the high output impedance portion of the stop bit period, the transmitting modified UART interface is free to send another frame of data.

If, on the other hand, the receiving modified UART interface is not ready to receive another frame of data (as indicated in FIG. 10 by an RX=Not OK condition for Case #2), the RTS control circuit couples the RX pin to ground through a relatively low impedance while it receives the stop bit. Because the TX buffer is driving the TX pin high though a high output impedance, the result is that the RX and TX pin voltages will be substantially discharged to ground, which is interpreted by the transmitting device as a CTS signal=0 condition. The CTS control circuit in the transmitting modified UART interface senses this low voltage on its TX pin as a conventional UART interface would sense a low state of the (now non-existent) CTS pin such that the transmitting device will refrain from sending another frame of data. When the RTS control circuit in the receiving UART interface couples its RX pin to ground through its high input impedance as in Case #1 of FIG. 10, the transmitting UART interface may proceed to transmit another frame.

Although the preceding discussion concerned flow control without the use of conventional RTS and CTS pins, it will be appreciated that an RTS pin and a CTS pin may be provided in embodiments that require backward compatibility with conventional UART transmission.

Figure 11:
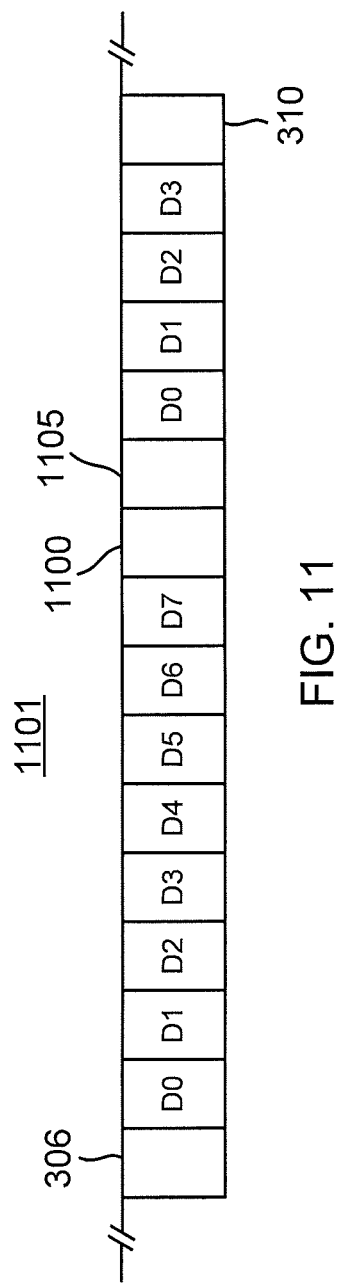
FIG. 11 is a diagram of a frame including an intermediate stop bit and an intermediate start bit in accordance with an aspect of the disclosure.

Given the flexible frame lengths enabled herein, note that the frame length may be increased such that the lack of synchronization between the oversampling clocks in the transmitting and receiving devices could lead to errors. In that regard, a 10-bit data payload for a frame will be represented by 160 samples assuming that a 16× oversampling clock is used. At this same sampling rate, a 20-bit data payload would be represented by 320 samples. As the number of samples increases, it becomes more likely that a receiving integrated circuit will under or over sample a given bit in the frame since the oversampling clocks in disparate devices are not synchronized. To maintain synchronicity, larger frames may include intermediate stop bits and start bits. The function bits discussed previously may program for the location of these intermediate bits in larger frames. For example, if it is known that a large frame will include an intermediate stop bit after the first 10 bits, then the receiving device can expect to have made 160 samples prior to the receipt of the intermediate stop bit (assuming that a 16× oversampling rate is used). If there are more or less samples, then the receiving device may adjust its oversampling rate accordingly to remain sufficiently synchronous with the transmitting device's oversampling rate. An example frame 1101 having an intermediate stop bit 1100 followed by an intermediate start bit 1105 is shown in FIG. 11. Frame 1101 begins with a start bit 306 and ends with a stop bit 310 as discussed with regard to frame 300 of FIG. 3. Intermediate stop bit 110 follows the first eight data bits D0 through D7. In contrast to stop bit 310, there needs to be no varying output impedance for the transmission of intermediate stop bit 110: the corresponding TX buffer may drive its TX pin to the power supply voltage for that bit. Conversely, the TX buffer would ground its TX pin to transmit intermediate start bit 1105.

Not only does the variable output impedance advantageously aid in the establishment of flow control over the two-wire interface, it also inherently protects against back-power conditions following power-on of the devices. In that regard, it may be the case as the devices are powered on that one integrated circuit is the first to drive its TX pin voltage high while a receiving device is still powered down. This asserted voltage being received at a powered-off device may form forward-biased parasitic diodes at the receiving device that waste current and also lead to latch-up or other glitches as the receiving device is finally powered on. This problem is conventionally denoted as a back-power condition. But the default high output impedance for the TX buffers disclosed herein inherently avoids this problem because it takes a certain amount of current to forward bias the parasitic diode in the receiving device. The high output impedance for the TX buffer limits the current drawn by the powered-off receiving device such that no back-power condition is created.

In addition, the high output impedance used at power-up is advantageous during the enumeration process. At power-on reset, prior to the initial enumeration, the TX pin's voltage level remains at "1" with a high output impedance. The device which asserts the TX pin with a state of "1" first gains the "master" status. This means that prior to setting the Tx pin to "1," the device checks the signal status at its RX pin. Since the master SOC always powers on first, its role as master is therefore ensured with this simple protocol. This same behavior ($1^{st}$ to turn-on becomes master) also resolves any conflict which may arise in a VGI interface involved in multi-drop configuration.

In the remote corner case condition, due to the de-bounce timing difference (which may occur from one device to another in multi-drop configuration), the $1^{St}$ iteration of the early enumeration results in failure. The subsequent attempt starts with the asynchronous local clock on each side trying to take lead as the master. Since the probability of the asynchronous clock's positive-edge on the two sides having zero phase difference is infinitely small, one of the two devices will always become the master.

Figure 12:
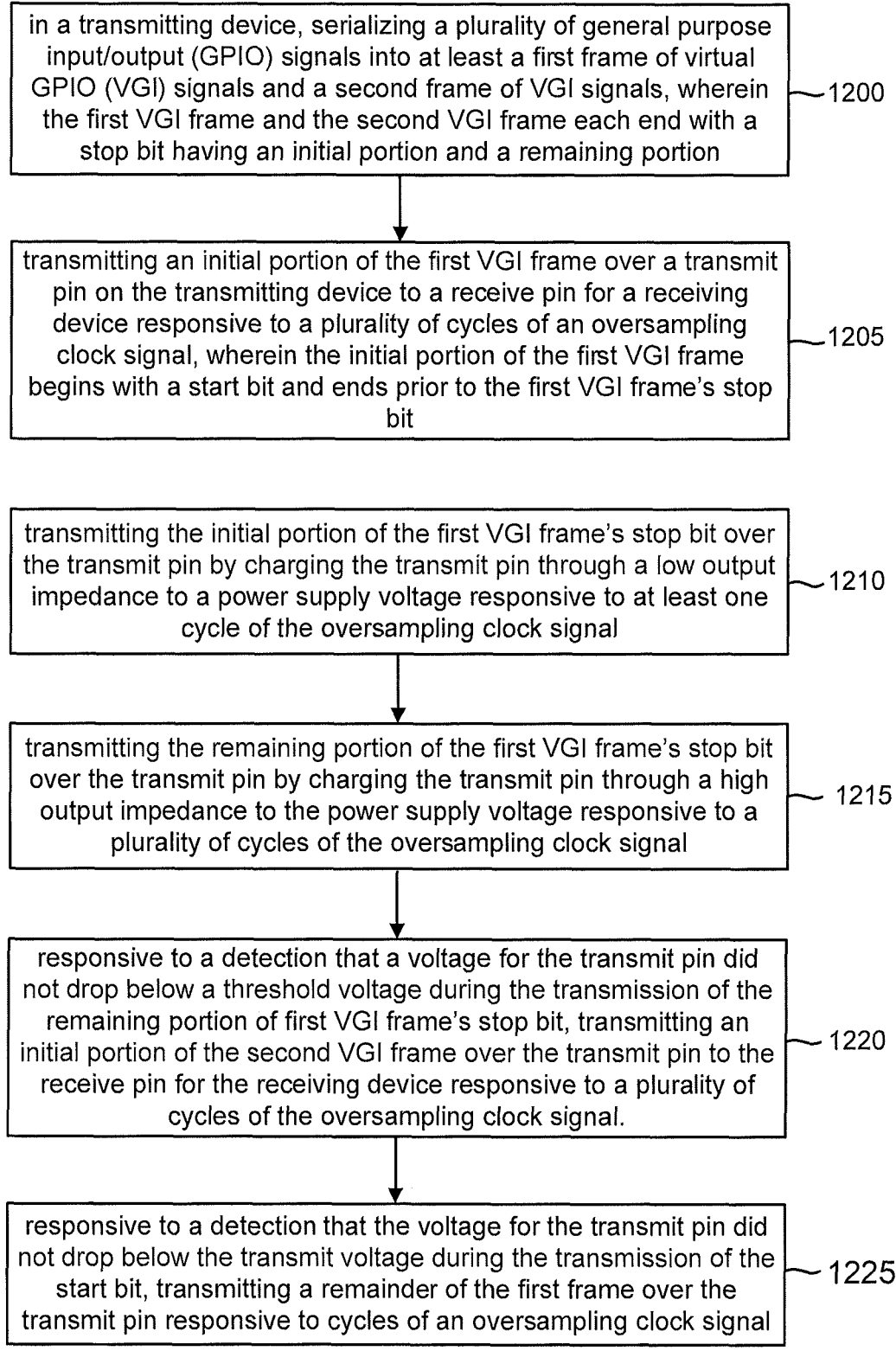
FIG. 12 is a flowchart for an example method of operation for a VGI device in accordance with an aspect of the disclosure.

An example method of operation for a host device such as host device 101 of FIG. 1 will now be discussed with regard to the flowchart of FIG. 12. The method includes an act 1200 of, in a transmitting device, serializing a plurality of general purpose input/output (GPIO) signals into at least a first frame of virtual GPIO (VGI) signals and a second frame of VGI signals, wherein the first VGI frame and the second VGI frame each end with a stop bit having an initial portion and a remaining portion. The serialization of a current frame and a subsequent frame in transmit shift register 805 of FIG. 8A is an example of act 1200.

The method also includes an act 1205 of transmitting an initial portion of the first VGI frame over a transmit pin on the transmitting device to a receive pin for a receiving device responsive to a plurality of cycles of an oversampling clock signal, wherein the initial portion of the first VGI frame begins with a start bit and ends prior to the first VGI frame's stop bit. The transmission of a frame's start bit through to the end of the frame's data payload as discussed with regard to TX buffer 815 of FIGS. 8A and 8B is an example of act 1205.

In addition, the method includes an act 1210 of transmitting the initial portion of the first VGI frame's stop bit over the transmit pin by charging the transmit pin through a low output impedance to a power supply voltage responsive to at least one cycle of the oversampling clock signal. The transmission of initial portion A discussed with regard to FIG. 9 is an example of act 1210.

The method also includes an act 1215 of transmitting the remaining portion of the first VGI frame's stop bit over the transmit pin by charging the transmit pin through a high output impedance to the power supply voltage responsive to a plurality of cycles of the oversampling clock signal. The transmission of remaining portion B discussed with regard to FIG. 9 is an example of act 1215.

Finally, the method includes an act 1220 of, responsive to a detection that a voltage for the transmit pin did not drop below a threshold voltage during the transmission of the remaining portion of first VGI frame's stop bit, transmitting an initial portion of the second VGI frame over the transmit pin to the receive pin for the receiving device responsive to a plurality of cycles of the oversampling clock signal. The shifting in of an initial portion of a subsequent frame from transmit shift register 805 into TX buffer 815 so that the initial portion may be transmitted over TX pin 111 as discussed with regard to FIG. 8A is an example of act 1220.

Figure 13:
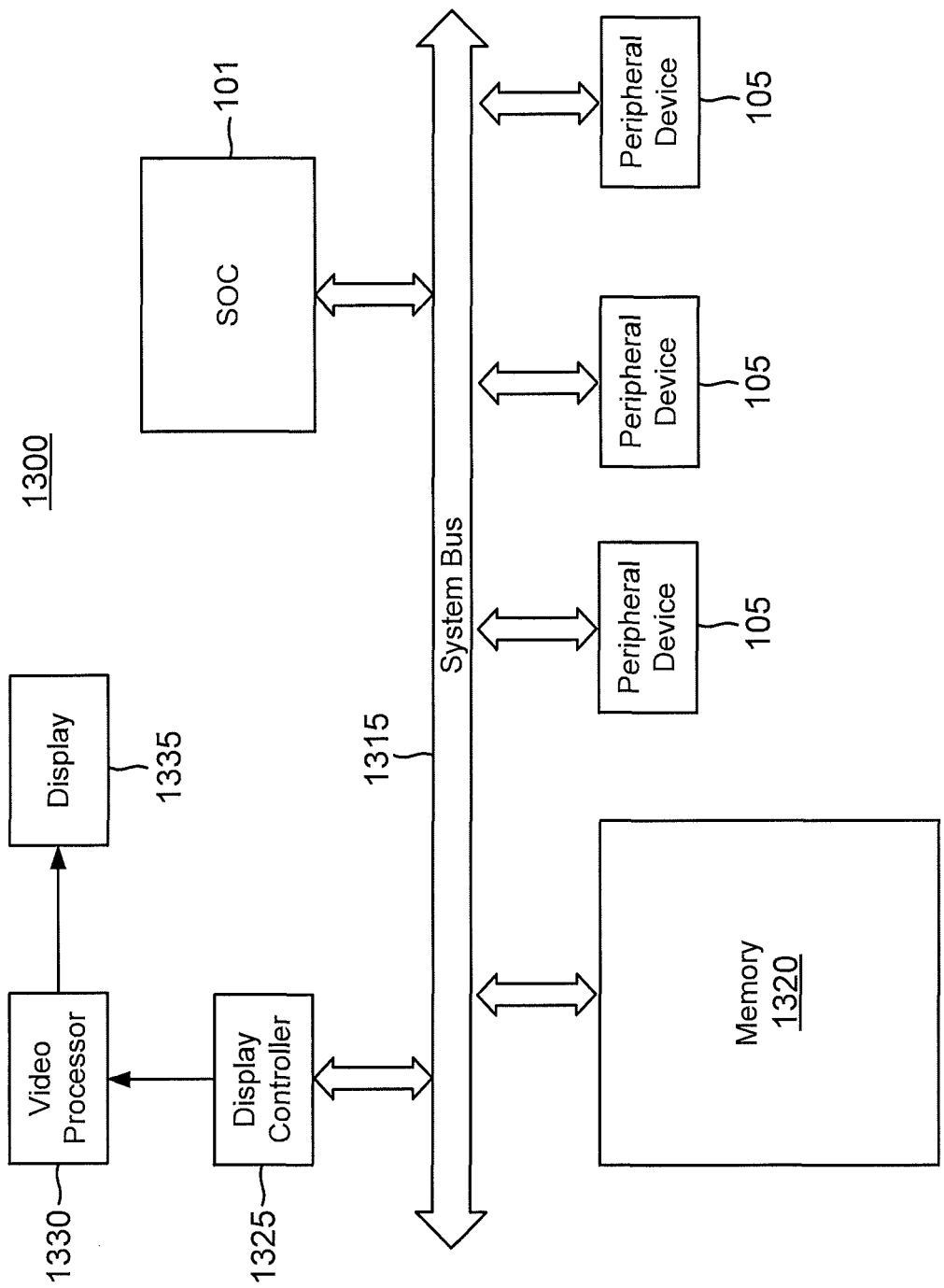
FIG. 13 is a block diagram for an example electronic system incorporating one of the integrated circuits shown in the system of FIG. 1.

Host device 101 in VGI architecture 100 of FIG. 1 may be incorporated as a system-on-a-chip (SOC) 1305 into a mobile device 1300 as shown in FIG. 13. Mobile device 1300 may comprise a cellular phone, smart phone, personal digital assistant, tablet computer, laptop computer, digital camera, handheld gaming device, or other suitable device. SOC 1305 communicates with peripheral ICs 1310 as discussed analogously with regard to VGI architecture 100 using two wires within a system bus 1315. System bus 1315 also couples to a memory such as a dynamic random access memory (DRAM) 1320 and to a display controller 1325. In turn display controller 1325 couples to a video processor 1030 that drives a display 1335. A programmable stop bit width to address the asynchronicity between the oversampling clocks in the transmitting and receiving devices will now be discussed.

Programmable Stop Bit Width

Referring again to FIG. 10, note that the receiving device samples frame 1000 with an oversampling clock signal that is asynchronous to the oversampling clock signal used by the transmitting device. If the oversampling clock rate is 16×, the receiving device would ideally sample each bit in frame 1000 sixteen times. The eighth sample from each bit may thus be used by the receiving device to make a bit decision by comparing the eighth sample to a threshold voltage such as one-half the power supply voltage VDD. If the eighth sample is greater than the threshold voltage, the receiving device may decode the corresponding bit as a binary one. Conversely, if the eighth sample is below the threshold voltage, the receiving device may decode the corresponding bit as a binary zero (in a logic high embodiment).

The oversampling clock rate and the frame length define limits on the asynchronicity between the oversampling clock signals in the transmitting and receiving device. Since frame 1000 is 10 bits long, a perfectly synchronized receiving device would sample frame 1000 with 160 samples at a 16× oversampling clock rate. If the eighth sample is used to determine each bit, the receiving oversampling clock rate cannot be too fast or too slow by 8/160=5% of the transmitting oversampling clock rate. If the receiving oversampling clock rate is less than 95% of the transmitting oversampling clock rate, the intended eighth sample of the stop bit in frame 1000 would instead be taken from the final data bit D7. Similarly, if the receiving oversampling clock rate is greater than 105% of the transmitting oversampling clock rate, the intended eighth sample of the stop bit would instead be taken after the end of the stop bit. Either scenario would of course lead to errors in decoding the presence of the stop bit.

As the receiving oversampling clock rate increases towards its maximum limit, the eighth sample taken by the receiving device of the stop bit gets closer and closer towards the end of frame 1000. Although the receiving device's RTS control circuit 830 (FIG. 8) can then select for its high or low input impedance depending upon whether the receiving device is ready to receive another frame, the transmitting device may have only one or two oversampling clock cycles in which to process its transmit pin voltage through its CTS control circuit 820 and transmit control circuit 810. It will be appreciated that transmit control circuit 810 thus needs several oversampling clock cycles of processing time to control transmit shift register 805 based upon whether its transmit pin voltage is discharged or not by the impedance-based flow control applied by RTS control circuit 830 in the receiving device. Even if the receiving oversampling clock rate is less than its maximum limit, the transmitting device may thus not have sufficient time to process the impedance-based flow control messaging from the receiving device. Note further that the transmission channel between transmit pin 111 on the transmitting device and receive pin 112 on the receiving device may aggravate this processing delay for the transmitter. In that regard, the transmission channel in a mobile device such as from an SOC 101 to a peripheral device 105 as discussed with regard to mobile device 1300 may be relatively short. However, the transmission channel in a personal computer (PC) implementation between one processor and another may be relatively long (e.g, a meter or more as compared to just millimeters in a mobile application). This increased channel length increases the time required by the receiving device to discharge transmit pin 111 low through a low input impedance as selected by RTS control circuit 830.

Figure 14:
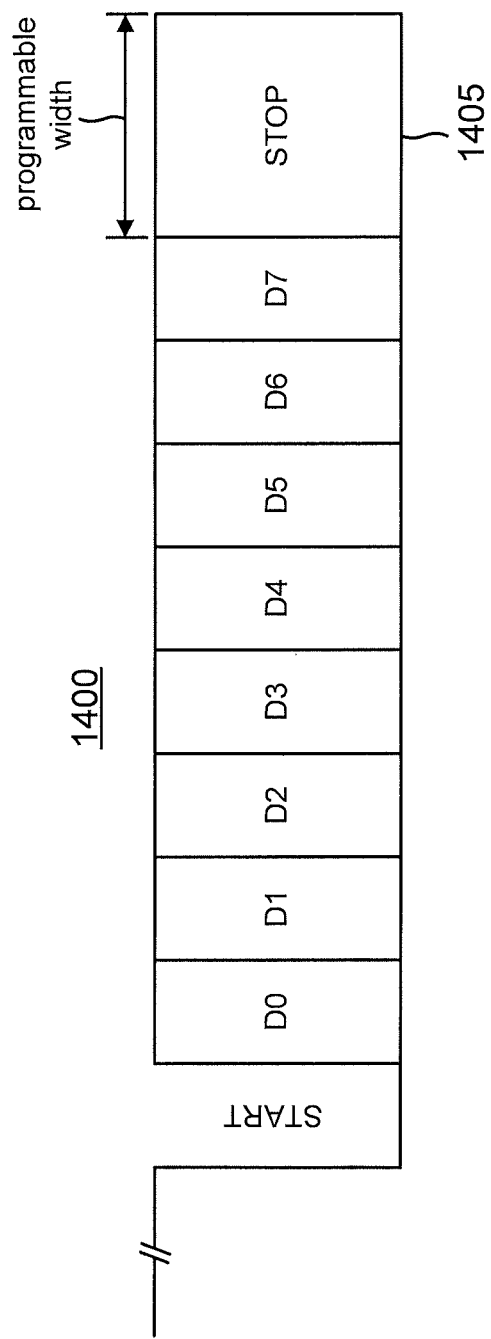
FIG. 14 is a diagram of a frame including a stop bit having a programmable width in accordance with an aspect of the disclosure.

To provide the transmitting device sufficient time to process the impedance-based flow control messaging from the receiving device, the width of a stop bit 1405 may be programmable as shown for a frame 1400 in FIG. 14. For example, the width of stop bit 1405 may be increased from its default value of one bit to 2.5 bits or even three bits or higher in width. This increased width to stop bit 1405 provides the transmitting device sufficient cycles of its oversampling clock signal to process the impedance-based flow control messaging from the receiving device. The transmitting device may program the width of stop bit 1405 expected by the receiving device through a programming frame having an appropriate function header such as discussed analogously with regard to FIG. 3.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising:
   a first processor;
   a transmit pin;
   a GPIO interface configured to receive a transmit set of GPIO signals from the processor and to transmit a first portion of the transmit set over a plurality of GPIO pins to a remote second processor;
   a finite state machine configured to serialize a remaining second portion of the transmit set of GPIO signals from the GPIO interface into a first virtual GPIO (VGI) frame and a second VGI frame, wherein the first VGI frame and the second VGI frame each ends with a stop bit;
   a transmit buffer configured to transmit an initial portion of the first VGI frame's stop bit over the transmit pin through a low output impedance responsive to at least one cycle of an oversampling clock signal and to transmit a remaining portion of first VGI frame's stop bit through a high output impedance responsive to a plurality of cycles of the oversampling clock signal; and
   a transmit control circuit configured to command the transmit buffer to transmit an initial portion of the second VGI frame responsive to a determination that a voltage for the transmit pin was above a threshold voltage during the transmission of the remaining portion of the first VGI frame's stop bit.

2. The integrated circuit of claim 1, further comprising:
   a clear to send (CTS) control circuit configured to determine whether the voltage for the transmit pin is below the threshold voltage during the transmission of the remaining portion of the first VGI frame's stop bit.

3. The integrated circuit of claim 1, further comprising an oversampling clock source for providing the oversampling clock signal.

4. The integrated circuit of claim 1, further comprising an oversampling clock source for providing the oversampling clock signal.

5. The integrated circuit of claim 1, wherein the finite state machine includes a plurality of messaging registers, and wherein the first processor is configured to write a plurality of universal asynchronous receiver transmitter (UART) signals to the messaging registers, and wherein the finite state machine is further configured to serialize the UART signals from the messaging registers into a first UART frame including a stop bit and a second UART frame including a stop bit, and wherein the transmit buffer is further configured to transmit an initial portion of the first UART frame's stop bit over the transmit pin through the low output impedance responsive to at least one cycle of the oversampling clock signal and to transmit a remaining portion of first UART frame's stop bit through the high output impedance responsive to a plurality of cycles of the oversampling clock signal.

6. The integrated circuit of claim 5, wherein the finite state machine is further configured a header to the first UART frame and to the second UART frame to identify the first UART frame and the second UART frame as each including a data payload of UART signals.

7. The integrated circuit of claim 1, wherein the finite state machine is further configured to attach a header to the first VGI frame and to the second VGI frame to identify the first VGI frame and the second VGI frame as each including a data payload of VGI signals.

8. The integrated circuit of claim 7, wherein the finite state machine is further configured to form a VGI programming frame that identifies a length for VGI data payloads, and wherein the transmit buffer is further configured to transmit the VGI programming frame over the transmit pin responsive to a plurality of cycles of the oversampling clock signal.

9. The integrated circuit of claim 8, further comprising:
   a receive pin;

a receive buffer, wherein the receive buffer is further configured to receive an acknowledgment frame that acknowledges the length identified by the VGI programming frame.

10. The integrated circuit of claim 9, wherein the integrated circuit is included within a device selected from the group consisting of a cellular phone, a smart phone, a personal digital assistant, a tablet computer, a laptop computer, a digital camera, and a handheld gaming device.

11. A method, comprising:
in a transmitting device, serializing a plurality of general purpose input/output (GPIO) signals into a first VGI frame and into a second VGI frame, wherein the first VGI frame and the second VGI frame each ends with a stop bit having an initial portion and a remaining portion;
transmitting an initial portion of the first VGI frame over a transmit pin on the transmitting device to a receive pin for a receiving device responsive to a plurality of cycles of an oversampling clock signal, wherein the initial portion of the first VGI frame begins with a start bit and ends prior to the first VGI frame's stop bit;
transmitting the initial portion of the first VGI frame's stop bit over the transmit pin by charging the transmit pin through a low output impedance to a power supply voltage responsive to at least one cycle of the oversampling clock signal;
transmitting the remaining portion of the first VGI frame's stop bit over the transmit pin by charging the transmit pin through a high output impedance to the power supply voltage responsive to a plurality of cycles of the oversampling clock signal; and
responsive to a detection that a voltage for the transmit pin did not drop below a threshold voltage during the transmission of the remaining portion of first VGI frame's stop bit, transmitting an initial portion of the second VGI frame over the transmit pin to the receive pin for the receiving device responsive to a plurality of cycles of the oversampling clock signal.

12. The method of claim 11, further comprising:
responsive to a detection that the voltage for the transmit pin did drop below the threshold voltage during the transmission of the remaining portion of first VGI frame's stop bit, entering a default mode in which the second VGI frame is not transmitted.

13. The method of claim 11, further comprising:
in the transmitting device, serializing a plurality of universal asynchronous receiver transmitter (UART) signals into a first UART frame including a stop bit and into a second UART frame including a stop bit, wherein each stop bit includes an initial portion and a remaining portion;
transmitting an initial portion of the first UART frame through the low output impedance over the transmit pin to the receive pin for the receiving device responsive to a plurality of cycles of the oversampling clock signal, wherein the initial portion of the first UART frame begins with a start bit and ends prior to the first UART frame's stop bit;
transmitting the initial portion of the first UART frame's stop bit over the transmit pin by charging the transmit pin through the low output impedance to the power supply voltage responsive to at least one cycle of the oversampling clock signal;
transmitting the remaining portion of the first UART frame's stop bit over the transmit pin by charging the transmit pin through the high output impedance to the power supply voltage responsive to a plurality of cycles of the oversampling clock signal; and
responsive to a detection that the voltage for the transmit pin did not drop below the threshold voltage during the transmission of the remaining portion of first UART frame's stop bit, transmitting an initial portion of the second UART frame over the transmit pin to the receive pin for the receiving device responsive to a plurality of cycles of the oversampling clock signal.

14. The method of claim 13, wherein serializing the plurality of UART signals into the first UART frame and into the second UART frame further includes attaching a header to the first UART frame to identify a data payload for the first UART frame as being a UART payload and attaching a header to the second UART frame to identify a data payload for the second UART frame as being a UART payload.

15. The method of claim 11, wherein serializing the plurality of general purpose input/output (GPIO) signals into the first VGI frame and into the second VGI frame further includes attaching a header to the first VGI frame to identify a data payload for the first VGI frame as being a VGI payload and attaching a header to the second VGI frame to identify a data payload for the second VGI frame as being a VGI payload.

16. An integrated circuit, comprising:
a first processor;
a plurality of general purpose input output (GPIO) pins;
a transmit pin;
a GPIO interface configured to receive a transmit set of GPIO signals from the first processor and to transmit a first portion of the transmit set over the GPIO pins to a remote second processor,
a finite state machine configured to serialize a remaining second portion of the transmit set of GPIO signals from the GPIO interface into at least a first virtual GPIO (VGI) frame including a stop bit;
a transmit buffer configured to transmit an initial portion of the first VGI frame's stop bit over the transmit pin through a low output impedance responsive to at least one cycle of an oversampling clock signal and to transmit a remaining portion of first VGI frame's stop bit through a high output impedance responsive to a plurality of cycles of the oversampling clock signal; and
means for comparing a voltage for the transmit pin to a threshold voltage for making a flow control decision with regard to a subsequent transmission of a second VGI frame by the transmit buffer.

17. The integrated circuit of claim 16, wherein the integrated circuit is included in a device selected from the group consisting of a cellular phone, a smart phone, a personal digital assistant, a tablet computer, a laptop computer, a digital camera, and a handheld gaming device.

18. The integrated circuit of claim 16, wherein the finite state machine includes a plurality of messaging registers, and wherein the first processor is configured to write a plurality of messaging signals to the messaging registers, and wherein the finite state machine is further configured to serialize the messaging signals from the messaging registers into a first messaging frame including a stop bit.

19. The integrated circuit of claim 18, wherein the finite state machine is further configured to insert a header into the first messaging frame to identify a data payload for the first messaging frame as being a messaging signal payload.

20. The integrated circuit of claim 16, wherein the finite state machine is further configured to insert a header into the first VGI frame to identify a data payload for the first VGI frame as being a VGI payload.

21. An integrated circuit, comprising:
a first processor;
a transmit pin;
a GPIO interface configured to receive a transmit set of GPIO signals from the processor and to transmit a first portion of the transmit set over a plurality of GPIO pins to a remote second processor;
a finite state machine configured to serialize a remaining second portion of the transmit set of GPIO signals from the GPIO interface into a plurality of virtual GPIO bits in a first virtual GPIO (VGI) frame and in a second VGI frame, wherein the first VGI frame and the second VGI frame each ends with a stop bit, and wherein the stop bit has a width that is wider than a width for each of the virtual GPIO bits;
a transmit buffer configured to transmit an initial portion of the first VGI frame's stop bit over the transmit pin through a low output impedance responsive to at least one cycle of an oversampling clock signal and to transmit a remaining portion of first VGI frame's stop bit through a high output impedance responsive to a plurality of cycles of the oversampling clock signal; and
a transmit control circuit configured to command the transmit buffer to transmit an initial portion of the second VGI frame responsive to a determination that a voltage for the transmit pin was above a threshold voltage during the transmission of the remaining portion of the first VGI frame's stop bit.

22. The integrated circuit of claim 21, wherein the width of the stop bit is between two and three times greater than the width for each of the virtual GPIO bits, the integrated circuit further comprising:
a clear to send (CTS) control circuit configured to determine whether the voltage for the transmit pin is below the threshold voltage during the transmission of the remaining portion of the first VGI frame's stop bit.

23. The integrated circuit of claim 21, further comprising an oversampling clock source for providing the oversampling clock signal.

24. The integrated circuit of claim 21, further comprising an oversampling clock source for providing the oversampling clock signal.

25. The integrated circuit of claim 21, wherein the finite state machine includes a plurality of messaging registers, and wherein the first processor is configured to write a plurality of universal asynchronous receiver transmitter (UART) signals to the messaging registers, and wherein the finite state machine is further configured to serialize the UART signals from the messaging registers into a first UART frame including a stop bit and a second UART frame including a stop bit, and wherein the transmit buffer is further configured to transmit an initial portion of the first UART frame's stop bit over the transmit pin through the low output impedance responsive to at least one cycle of the oversampling clock signal and to transmit a remaining portion of first UART frame's stop bit through the high output impedance responsive to a plurality of cycles of the oversampling clock signal.

26. The integrated circuit of claim 25, wherein the finite state machine is further configured a header to the first UART frame and to the second UART frame to identify the first UART frame and the second UART frame as each including a data payload of UART signals.

27. The integrated circuit of claim 21, wherein the finite state machine is further configured to attach a header to the first VGI frame and to the second VGI frame to identify the first VGI frame and the second VGI frame as each including a data payload of VGI signals.

28. The integrated circuit of claim 27, wherein the finite state machine is further configured to form a VGI programming frame that programs the width for the stop bit.

29. The integrated circuit of claim 28, further comprising:
a receive pin;
a receive buffer, wherein the receive buffer is further configured to receive an acknowledgment frame that acknowledges the width for the stop bit identified by the VGI programming frame.

30. The integrated circuit of claim 29, wherein the integrated circuit is included within a device selected from the group consisting of a cellular phone, a smart phone, a personal digital assistant, a tablet computer, a laptop computer, a digital camera, and a handheld gaming device.

31. A method, comprising:
in a transmitting device, serializing a plurality of general purpose input/output (GPIO) signals into a plurality of virtual GPIO (VGI) bits included in a first VGI frame and in a second VGI frame, wherein the first VGI frame and the second VGI frame each ends with a stop bit having an initial portion and a remaining portion, and wherein each VGI bit has a first width and each stop bit has a second width, and wherein the second width is greater than the first width;
transmitting an initial portion of the first VGI frame over a transmit pin on the transmitting device to a receive pin for a receiving device responsive to a plurality of cycles of an oversampling clock signal, wherein the initial portion of the first VGI frame begins with a start bit and ends prior to the first VGI frame's stop bit;
transmitting the initial portion of the first VGI frame's stop bit over the transmit pin by charging the transmit pin through a low output impedance to a power supply voltage responsive to at least one cycle of the oversampling clock signal;
transmitting the remaining portion of the first VGI frame's stop bit over the transmit pin by charging the transmit pin through a high output impedance to the power supply voltage responsive to a plurality of cycles of the oversampling clock signal; and
responsive to a detection that a voltage for the transmit pin did not drop below a threshold voltage during the transmission of the remaining portion of first VGI frame's stop bit, transmitting an initial portion of the second VGI frame over the transmit pin to the receive pin for the receiving device responsive to a plurality of cycles of the oversampling clock signal.

32. The method of claim 31, further comprising:
responsive to a detection that the voltage for the transmit pin did drop below the threshold voltage during the transmission of the remaining portion of first VGI frame's stop bit, entering a default mode in which the second VGI frame is not transmitted.

33. The method of claim 31, further comprising:
in the transmitting device, serializing a plurality of universal asynchronous receiver transmitter (UART) signals into a plurality of UART bits contained in a first UART frame including a UART stop bit and into a second UART frame including a UART stop bit, wherein each UART stop bit includes an initial portion and a remaining portion, and wherein each UART bit has a width that is less than a width for each UART stop bit;

transmitting an initial portion of the first UART frame through the low output impedance over the transmit pin to the receive pin for the receiving device responsive to a plurality of cycles of the oversampling clock signal, wherein the initial portion of the first UART frame begins with a start bit and ends prior to the first UART frame's UART stop bit;

transmitting the initial portion of the first UART frame's UART stop bit over the transmit pin by charging the transmit pin through the low output impedance to the power supply voltage responsive to at least one cycle of the oversampling clock signal;

transmitting the remaining portion of the first UART frame's UART stop bit over the transmit pin by charging the transmit pin through the high output impedance to the power supply voltage responsive to a plurality of cycles of the oversampling clock signal; and responsive to a detection that the voltage for the transmit pin did not drop below the threshold voltage during the transmission of the remaining portion of first UART frame's UART stop bit, transmitting an initial portion of the second UART frame over the transmit pin to the receive pin for the receiving device responsive to a plurality of cycles of the oversampling clock signal.

34. The method of claim 33, wherein serializing the plurality of UART signals into the plurality of UART bits contained in the first UART frame and in the second UART frame further includes attaching a header to the first UART frame to identify a data payload for the first UART frame as being a UART payload and attaching a header to the second UART frame to identify a data payload for the second UART frame as being a UART payload.

35. The method of claim 31, wherein serializing the plurality of general purpose input/output (GPIO) signals into the plurality of VGI bits contained in the first VGI frame and in the second VGI frame further includes attaching a header to the first VGI frame to identify a data payload for the first VGI frame as being a VGI payload and attaching a header to the second VGI frame to identify a data payload for the second VGI frame as being a VGI payload.

* * * * *